United States Patent
Goto et al.

(10) Patent No.: US 10,207,668 B2
(45) Date of Patent: Feb. 19, 2019

(54) SIDE AIRBAG DEVICE

(71) Applicant: TOYODA GOSEI CO., LTD., Kiyosu-shi, Aichi-ken (JP)

(72) Inventors: Yoshiaki Goto, Kiyosu (JP); Kensaku Honda, Kiyosu (JP); Akira Suzuki, Kiyosu (JP); Masao Kino, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 114 days.

(21) Appl. No.: 15/213,733

(22) Filed: Jul. 19, 2016

(65) Prior Publication Data
US 2017/0028962 A1  Feb. 2, 2017

(30) Foreign Application Priority Data
Jul. 31, 2015  (JP) ................. 2015-151868

(51) Int. Cl.
*B60R 21/237* (2006.01)
*B60R 21/207* (2006.01)
*B60R 21/231* (2011.01)

(52) U.S. Cl.
CPC ...... *B60R 21/23138* (2013.01); *B60R 21/207* (2013.01); *B60R 21/237* (2013.01); *B60R 2021/2076* (2013.01); *B60R 2021/23146* (2013.01)

(58) Field of Classification Search
CPC ............. B60R 21/201; B60R 21/207; B60R 21/23138; B60R 21/237; B60R 2021/2076; B60R 2021/23146
See application file for complete search history.

(56) References Cited

U.S. PATENT DOCUMENTS

| 5,542,691 A * | 8/1996 | Marjanski ............ B60R 21/201 280/728.2 |
| 5,547,214 A * | 8/1996 | Zimmerman, II ....... B60N 2/58 280/730.1 |
| 5,732,971 A * | 3/1998 | Lutz ..................... B60R 21/201 280/728.2 |
| 5,765,867 A * | 6/1998 | French .................. B60R 21/16 280/743.1 |

(Continued)

FOREIGN PATENT DOCUMENTS

| JP | 2001-354103 A | 12/2001 |
| JP | 2005-212664 A | 8/2005 |

(Continued)

OTHER PUBLICATIONS

Office action dated Apr. 23, 2018 issued in corresponding JP patent application No. 2015-151868 (and English translation thereof).

*Primary Examiner* — Barry Gooden, Jr.
(74) *Attorney, Agent, or Firm* — Posz Law Group, PLC

(57) ABSTRACT

A side airbag device includes a folded-up airbag and a limitation member disposed around the airbag for constraining the airbag from protruding forward at airbag deployment. The limitation member is formed of a flexible sheet member into a band shape, and is joined to the folded-up airbag by the opposite end regions. The limitation member includes a loose region which is arranged around the folded-up airbag in such a manner as to be remote from the folded-up airbag. The loose region is disposed on a side of the folded-up airbag towards which the airbag protrudes. The loose region includes a tearable region in the region in a deployment direction of the airbag.

7 Claims, 29 Drawing Sheets

(56) References Cited

U.S. PATENT DOCUMENTS

| | | | | |
|---|---|---|---|---|
| 5,779,263 | A * | 7/1998 | Lane, Jr. | B60R 21/201 280/728.2 |
| 5,823,566 | A * | 10/1998 | Manire | B60R 21/201 280/728.3 |
| 6,070,904 | A * | 6/2000 | Ozaki | B60R 21/16 280/728.1 |
| 6,099,026 | A * | 8/2000 | Ando | B60R 21/201 280/728.1 |
| 6,612,610 | B1 * | 9/2003 | Aoki | B60R 21/201 280/730.2 |
| 9,701,270 | B2 * | 7/2017 | Goto | B60R 21/233 |
| 2002/0047253 | A1 | 4/2002 | Rasch et al. | |
| 2005/0156412 | A1 * | 7/2005 | Panagos | B60R 21/201 280/730.2 |
| 2007/0007757 | A1 * | 1/2007 | Bauer | B60R 21/20 280/743.2 |
| 2008/0217892 | A1 * | 9/2008 | Maripudi | B60R 21/201 280/740 |
| 2008/0238057 | A1 | 10/2008 | Inoue et al. | |
| 2009/0289441 | A1 * | 11/2009 | Kakstis | B60R 21/20 280/728.1 |
| 2012/0175924 | A1 * | 7/2012 | Festag | B60R 21/207 297/216.1 |
| 2015/0123382 | A1 * | 5/2015 | Rickenbach | B60R 21/207 280/728.2 |
| 2015/0367810 | A1 * | 12/2015 | Gilles | B60R 21/201 280/730.1 |
| 2017/0028958 | A1 * | 2/2017 | Goto | B60R 21/233 |
| 2018/0086296 | A1 * | 3/2018 | Kino | B60R 21/201 |

FOREIGN PATENT DOCUMENTS

| | | |
|---|---|---|
| JP | 2008-247211 A | 10/2008 |
| JP | 2010-83439 A | 4/2010 |

* cited by examiner

Fig. 11
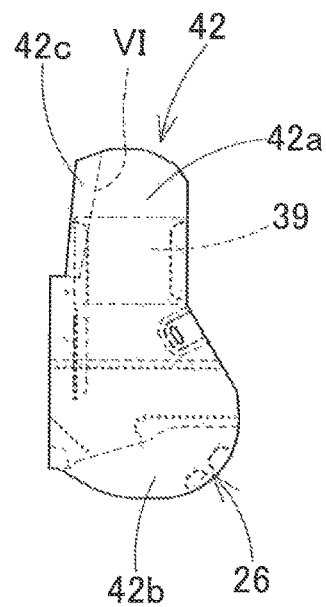
(A)
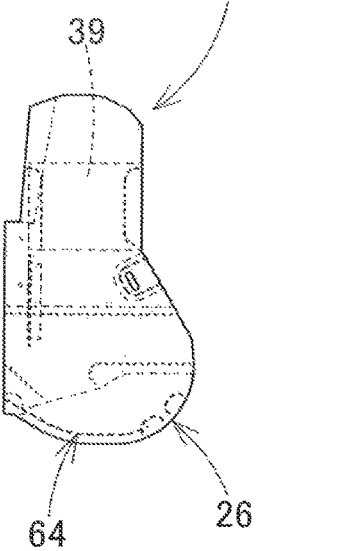
(B)
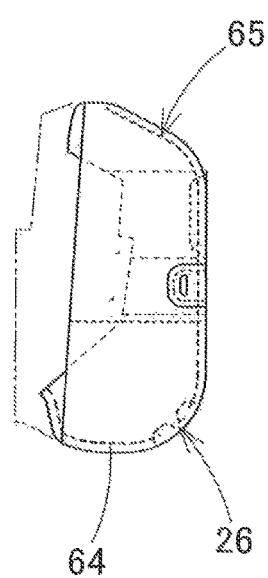
(C)
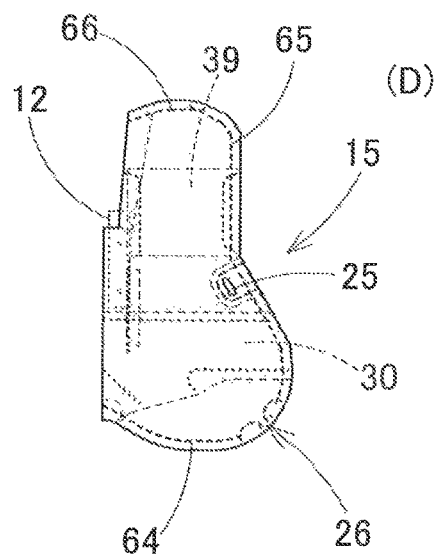
(D)

Fig. 17
(A)
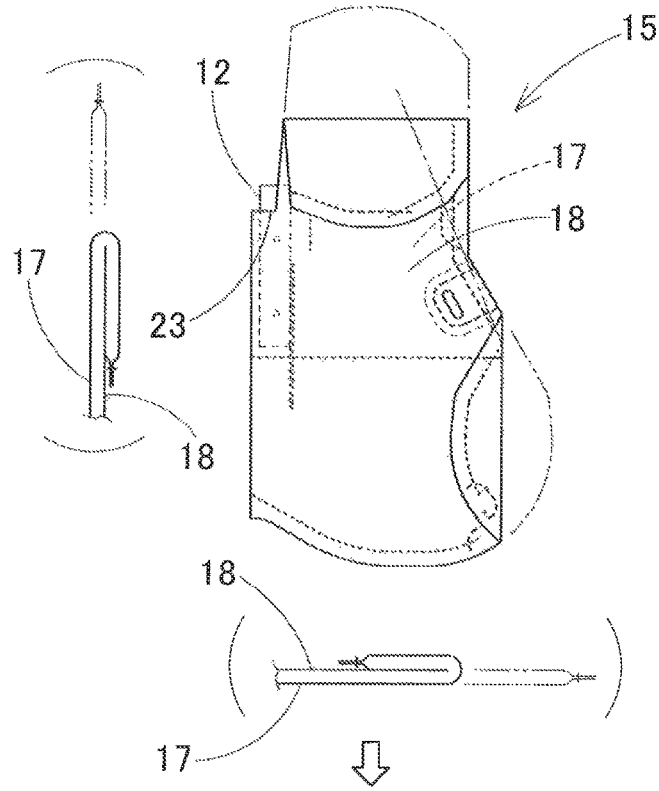
(B)
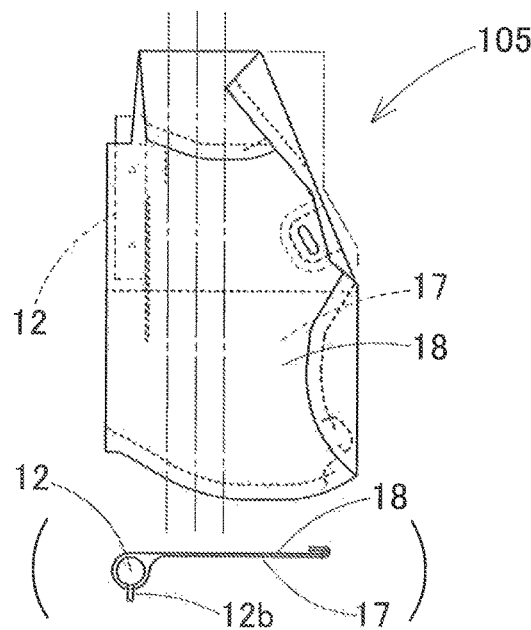

Fig. 18
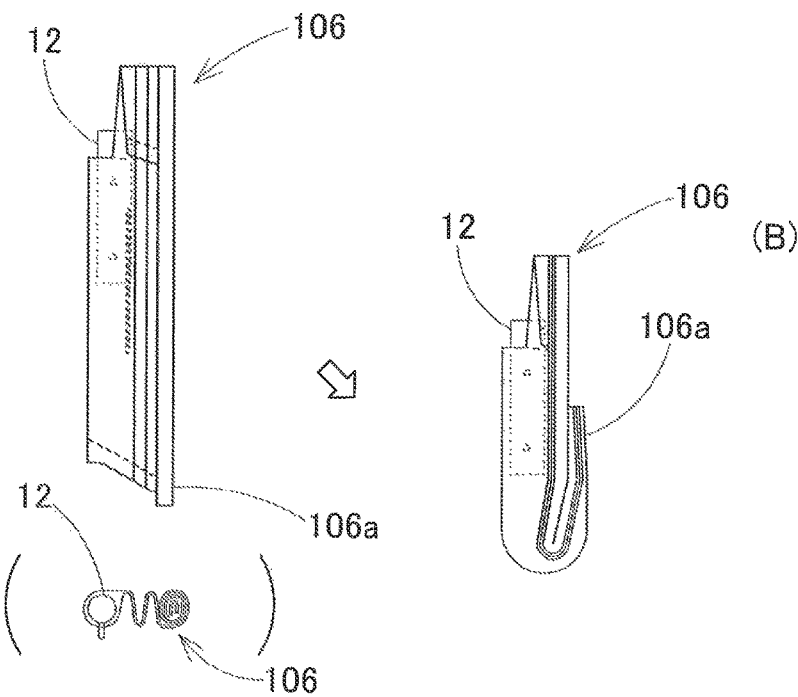
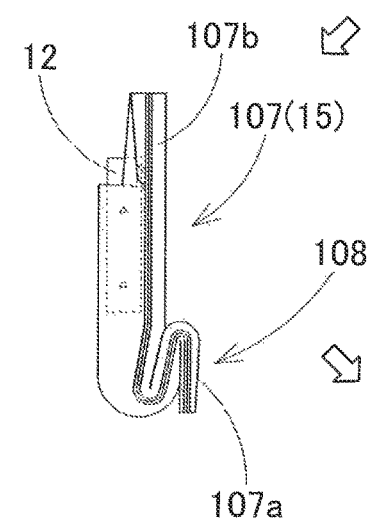
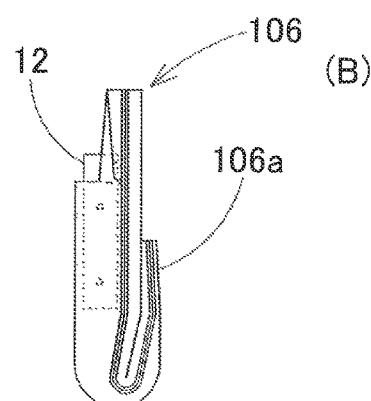
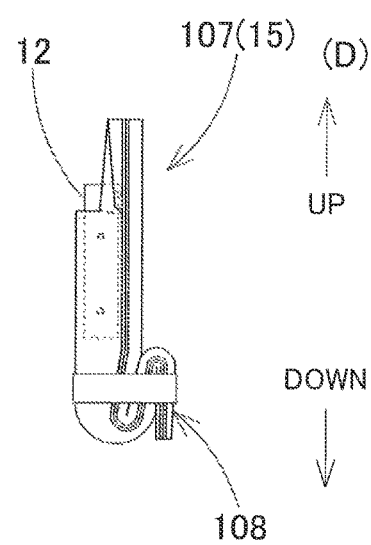

SIDE AIRBAG DEVICE

CROSS REFERENCE TO RELATED APPLICATIONS

The present application claims priority from Japanese Patent Application No. 2015-151868 of Goto et al., filed on Jul. 31, 2015, the entire disclosure of which is incorporated herein by reference.

BACKGROUND OF THE INVENTION

1. Field of the Invention

The present invention relates to a side airbag device which includes an airbag adapted to be mounted on a backrest of a seat of a vehicle in a folded-up configuration and a limitation member which is disposed around the airbag for constraining airbag deployment.

2. Description of Related Art

JP 2001-354103A discloses a known side airbag device which includes a limitation member disposed around a folded-up airbag. The limitation member includes a tearable seam.

In this conventional side airbag device, when, at airbag deployment, an obstacle such as a vehicle occupant is situated in front of the front side of a housing area in which the folded-up airbag is stored, the limitation member constrains the airbag from protruding forward. When the occupant is seated in his normal seating position (i.e., in a normal protecting situation), the tearable seam of the limitation member is torn due to increase of the internal pressure of the airbag, and the airbag is deployed at a side of the occupant.

According to the description of the paragraph 0039 of the prior art reference specified above, however, the airbag stays checked from unfolding by the limitation member and only a comparatively low pressure is built up in the airbag when the obstacle such as an occupant is located in proximity to the deploying airbag. This description implies that the limitation member itself is inflatable with an inflation gas when the obstacle is located in proximity to the deploying airbag. It is also presumed that the limitation member has a bag-like contour and covers the airbag all over. In a normal protecting situation, the airbag of this conventional side airbag device tears a tearable seam of the limitation member and completes deployment when having gained an enough pressure. However, if the limitation member has a bag-like contour as presumed above, it is presumed that the airbag will not be inflated quickly because the tear seam should not be torn quickly.

SUMMARY OF THE INVENTION

The object of the present invention is to provide a side airbag device which is capable of preventing a deploying airbag from giving a strong pressure to an obstacle when the obstacle is located in proximity to the airbag and is, at the same time, capable of deploying the airbag quickly in a normal protecting situation.

The object of the invention will be achieved by the following side airbag device:

The side airbag device of the invention is adapted to be mounted on a back portion of a seat of a vehicle and includes:

an airbag that is housed in a housing in a folded-up configuration and is configured to be deployed forward when fed with an inflation gas by an inflator, the folded-up airbag having an elongated outer contour extending generally in an up and down direction as mounted on the seat; and a limitation member that is arranged around the folded-up airbag for constraining the airbag from protruding forward at airbag deployment.

The limitation member is formed of a flexible sheet member into a band shape, and is joined with the folded-up airbag by a pair of joint regions which are located at opposite ends of the limitation member. The limitation member includes a loose region that is disposed between the joint regions and arranged around the folded-up airbag in such a manner as to be remote from the folded-up airbag (i.e., in a loose fashion). The loose region is disposed on a side of the folded-up airbag towards which the airbag protrudes. The length of the loose region between the joint regions is longer than a length of an outer circumference of the folded-up airbag and shorter than a film length of the airbag as deployed. The loose region includes a tearable region that is tearable in such a manner as to split up a region between the joint regions at airbag deployment.

With the side airbag device of the invention, when the airbag is fed with an inflation gas, the airbag firstly unfolds the loose region of the limitation member and is inflated in such a manner as to fill up the space inside the loose region. Then the airbag tears the tearable region of the loose region, and protrudes forward and completes deployment. That is, the limitation member mounted around the airbag is once unfolded into a generally tube and holds the airbag from protruding forward, and then is torn and allows the airbag to be deployed forward. The airbag is thus held back from protruding considerably forward in an initial stage of inflation. Accordingly, the airbag is prevented from pushing an obstacle such as a vehicle occupant forcefully if the obstacle is situated just in front of the housing of the airbag at airbag deployment (i.e., in an obstructed situation).

Further, the limitation member is formed into a band and joined to the folded-up airbag by the joint regions formed at the opposite ends. Accordingly, the limitation member does not wrap up the folded-up airbag all over, but leaves an upper and/or lower region of the folded-up airbag uncovered. Thus the uncovered region will be allowed to inflate quickly without being regulated by the limitation member. Moreover, the tearable region of the loose region is located at the region in a deployment direction of the airbag. With this configuration, when the airbag device is actuated while the occupant is seated in his normal seating position (i.e., in a normal protecting situation), the uncovered region of the folded-up airbag will be inflated quickly and help tear the tearable region of the loose region quickly, such that the airbag completes deployment in time to protect the occupant. As a consequence, in a normal protecting situation, the airbag device of the invention can inflate the airbag quickly enough to protect the occupant seated in the seat in an adequate fashion.

Therefore, the side airbag device of the illustrated embodiment is capable of preventing a deploying airbag from giving a strong pressure to an obstacle when the obstacle is located in proximity to the airbag and is, at the same time, capable of deploying the airbag quickly in a normal protecting situation.

It is desired in the present invention that the loose region is wrapped around the folded-up airbag in such a state that is doubled on a mountain-fold crease. This configuration will not cause bulkiness due to the presence of the loose region. Since the loose region is disposed around the folded-up airbag in a space-saving fashion, the folded-up airbag can be stored in the housing smoothly.

It is further desired in the present invention that the length of a region of the limitation member between the joint regions is configured such that a top of the loose region is disposed at a position corresponding to a vicinity of a front end of the back portion of the seat in a horizontal cross-sectional view depicting a situation in which the loose region as mounted around the folded-up airbag and mounted on the seat is extended forward.

In other words, it is desired that the length of the region of the limitation member between the joint regions is configured such that the tearable region as the airbag device is mounted on the seat is located inside the back portion of the seat before being torn in an initial stage of airbag deployment.

With this configuration, the airbag will be once inflated in such a manner as to fill up the space inside the loose region inside the back portion of the seat, and then tear the tearable region and protrude forward out of the back portion. That is, the airbag device is capable of further preventing the airbag in the course of deployment from giving a strong pressure to an obstacle when the obstacle is located in proximity to the back portion.

Furthermore, if the tearable region includes a starting point of tearing at one end thereof in an up and down direction, the tearable region will be torn quickly from the starting point. This configuration will also enable the inflating speed to be different from region to region in the up and down direction of the airbag. That is, this configuration will help predetermine a region to inflate quickly and a region to be constrained from protruding by the limitation member in an up and down direction of the airbag.

Moreover, it is desired that:
the inflator is generally cylindrical in outer contour and is housed in a rear end region of the folded-up airbag;
the inflator is provided with gas discharge ports at a lower end thereof; a lower edge of the loose region is located in a vicinity of a front region of the gas discharge ports; and
the loose region includes a cut-out region that tapers towards the tearable region such that the cut-out region constitutes the starting point of tearing of the tearable region.

With this configuration, when fed with an inflation gas from the gas discharge ports located at the lower end region of the inflator, the lower end region of the folded-up airbag is firstly inflated. Since the loose region is provided with the cut-out region at the lower edge, the lower end region of the folded-up airbag is allowed to be inflated quickly without being influenced by the loose region. Then along with the inflation of the lower end region, the tearable region will be torn sequentially from the lower end. Therefore, the tearable region will be torn quickly and the whole airbag will be deployed considerably forward.

In the side airbag device with the above configuration, it is desired that the airbag includes a pelvis protecting portion for protecting the pelvis of an occupant seated in the seat at the lower end region of the airbag at deployment, and that the pelvis protecting portion protrudes out of the limitation member downwardly in the folded-up airbag. With this configuration, the airbag device can inflate the pelvis protecting portion quickly in a normal protecting situation and quickly arrest the pelvis which has a greater mass and a greater kinetic energy at moving than the thorax.

BRIEF DESCRIPTION OF DRAWINGS

FIG. 9, FIG. 10 and FIG. 11 schematically illustrate the production process of the airbag of FIG. 3;

FIG. 17 and FIG. 18 schematically illustrate the folding process of the airbag of the embodiment;

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
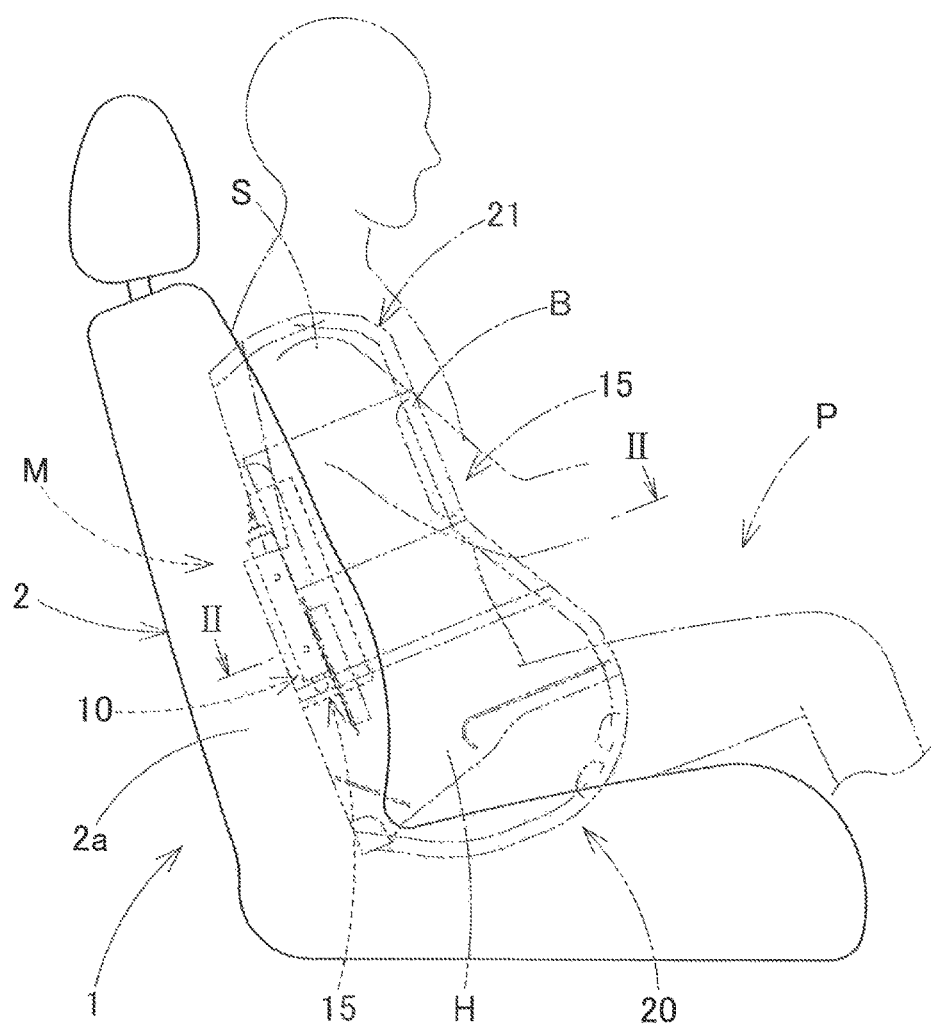
FIG. 1 depicts a side airbag device embodying the invention in service as viewed from a side.
Figure 2:
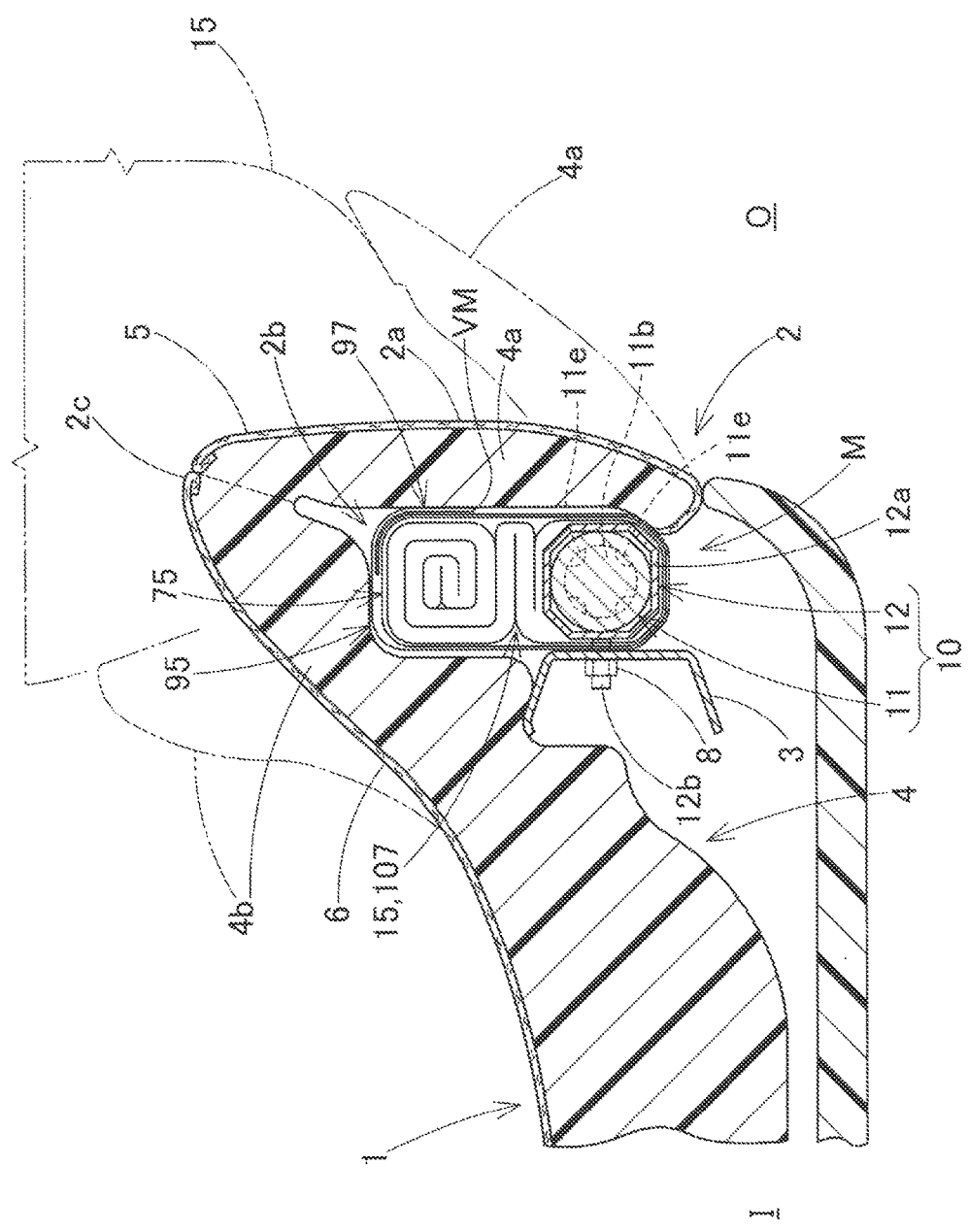
FIG. 2 is a schematic cross sectional view of the airbag device of Fig .1 taken along II-II of FIG. 1.

As shown in FIGS. 1 and 2, the side airbag device M embodying the present invention is stored inside a housing area 2b provided at an outboard side (on the right side, in the illustrated embodiment) 2a of a back portion 2 of a seat 1 of a vehicle. Unless otherwise specified, up/down, front/rear, and left/right directions in this specification are intended to refer to up/down, front/rear, and left/right directions of the vehicle.

The back portion 2 includes a seat frame 3 extending generally vertically. The airbag device M is secured to the seat frame 3 by fastening nuts 8 with bolts 12b projecting out of a retainer 12 of the inflator 10 as shown in FIG. 2. In FIG. 2, a member indicated at 4 is a cushion, and members indicated at 5 and 6 are surface skins made of decoration fabric or the like. The right peripheral region (the peripheral region facing toward the outside O) 4a of the cushion 4 covers the airbag device M on the front and the outboard side. Upon deployment of the airbag 15, the peripheral region 4a is pushed by the airbag 15 and separated from a center region 4b of the cushion 4.

As shown in FIG. 2, the airbag device M of the illustrated embodiment includes an airbag 15, which is folded up into a folded-up body 107, an inflator 10 for supplying the airbag 15 with an inflation gas, a wrapping member 75 which wraps the airbag 15 in the form of the folded-up body 107, and a limitation member 95 disposed around the folded-up body 107 wrapped up by the wrapping member 75. In this embodiment, the folded-up body 107 refers to the airbag 15 in a folded-up configuration.

Figure 3:
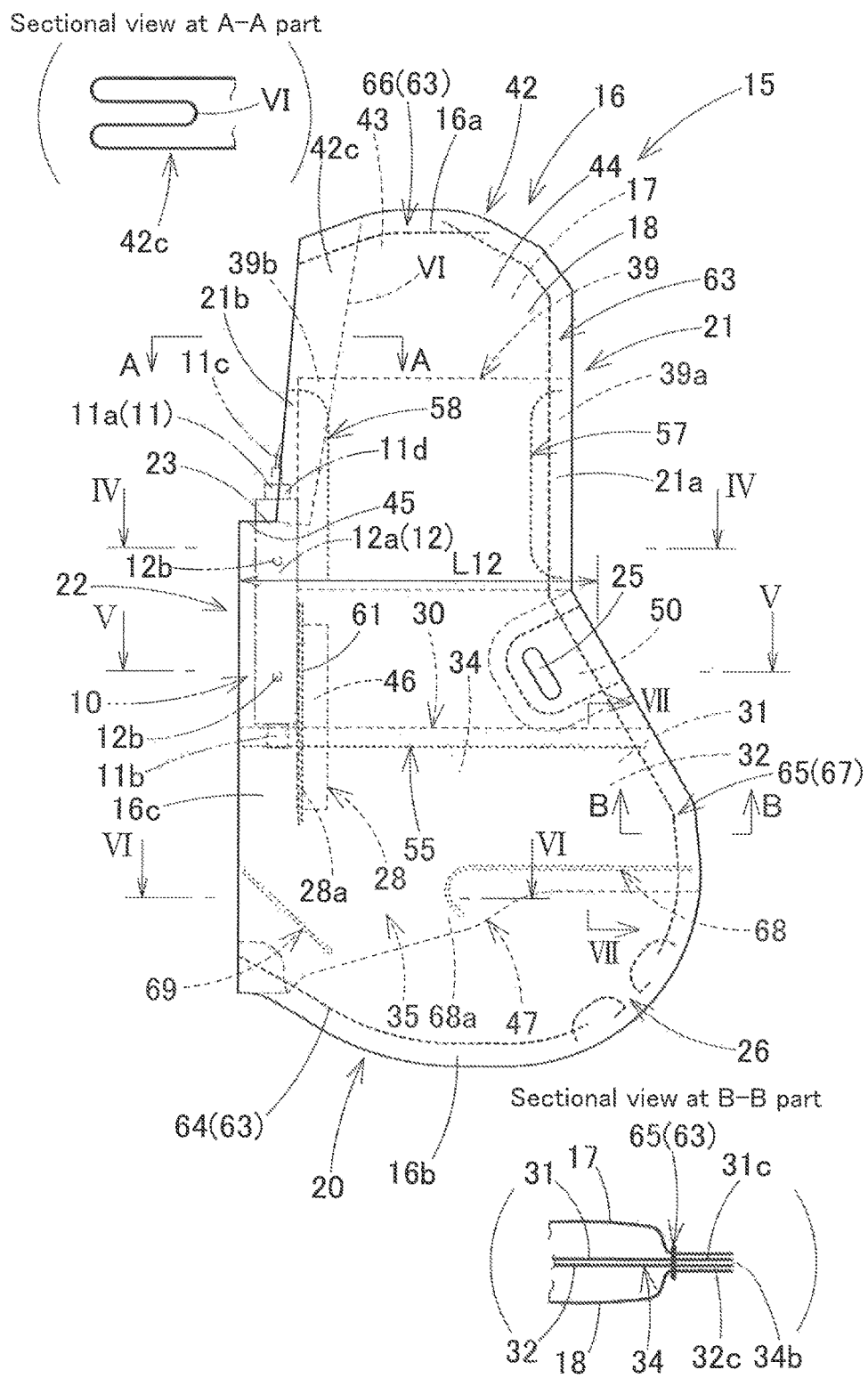
FIG. 3 is a front elevation of an airbag for use in the airbag device of FIG. 1.
Figure 23:
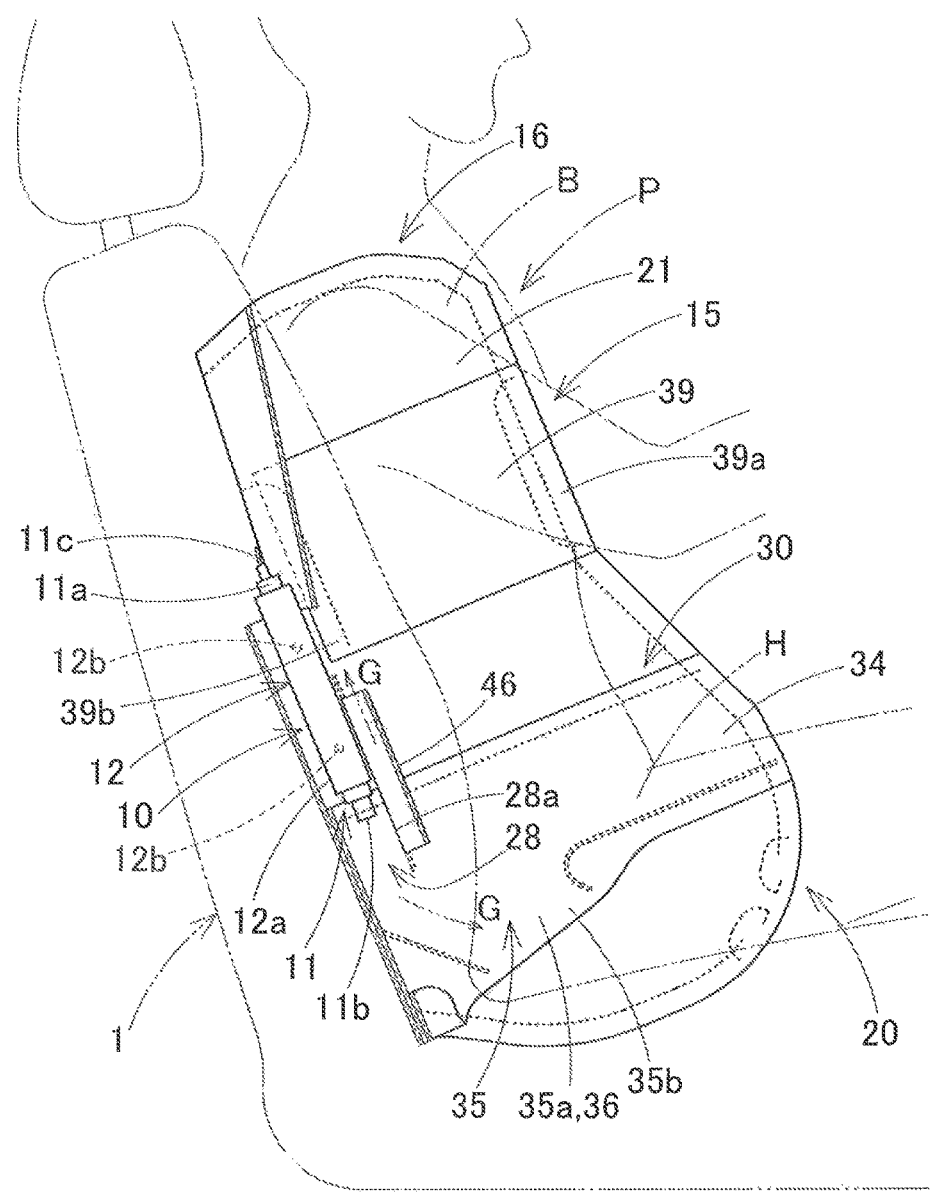
FIG. 23 is a schematic vertical sectional view depicting the airbag having completed deployment.

As shown in FIGS. 2, 3 and 23, the inflator 10 includes a generally cylindrical body 11 and a retainer 12 mounted around the body 11. In this specific embodiment, the body 11 includes a great diameter portion 11a which is generally cylindrical in outer contour and a small diameter portion 11b located at the bottom of the great diameter portion 11a and provided with gas discharge ports 11e. Lead wires 11c extend from the top 11d of the body 11. The retainer 12 includes a generally tubular holding portion 12a that holds the inflator body 11 and two mounting bolts 12b projecting toward the left (towards an inboard direction) from the holding portion 12a. The bolts 12b are located at two positions in an up and down direction of the holding portion 12a. The inflator 10 is housed inside the airbag 15 with the bolts 12b projecting out of later-described mounting holes 22a of the airbag 15 and with the top 11d of the body 11 protruding out of a later-described insert opening 23 of the airbag 15. By fastening the bolts 12b, which project out of the mounting holes 22a of the airbag 15, mounting holes 77a of the wrapping member 75 and through holes 96a of the limitation member 95, to the frame 3 of the seat 1 by the nuts 8, the inflator 10 is secured to the seat frame 3 together with the airbag 15. As shown in FIGS. 2 and 3, when the airbag device M is mounted on board, the inflator 10 is housed at a rear end of and inside of the folded-up body 107.

As shown in FIGS. 3 to 7, the airbag 15 of the illustrated embodiment includes a bag body 16 which is inflatable with an inflation gas, an inner tube 28, a partition wall 30 which partitions the interior of the bag body 16 and a regulating member 39 which helps regulate the contour of the airbag 15 as fully inflated.

Figure 8:
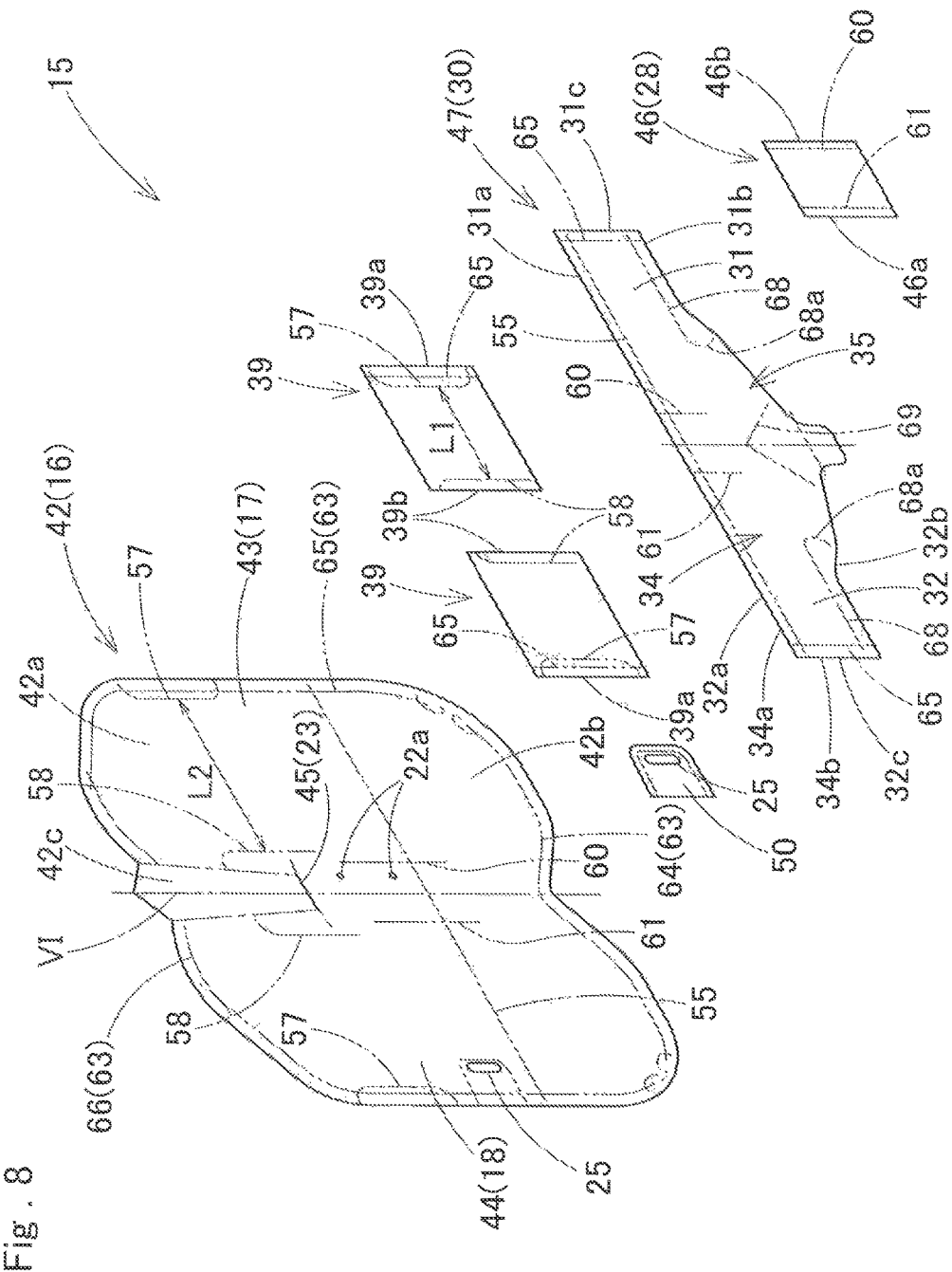
FIG. 8 depicts base members of the airbag of FIG. 3 schematically.

As shown in FIGS. 3 and 23, the bag body 16 is inflatable into a generally oval plate widening towards the lower end 16b so as to protect the thorax B and pelvis H of an occupant seated in the seat 1. The bag body 16 includes an inboard side wall 17 which is deployable at an inboard side (right beside the occupant) and an outboard side wall 18 which is deployable at an outboard side, and is formed into a bag by being joined together (sewn together) by the outer circumferential edges of the walls 17 and 18. As shown in FIG. 8, the bag body 16 of the illustrated embodiment is composed of a base member 42 having such a shape that an inboard side region 43, which constitutes the inboard side wall 17, and an outboard side region 44, which constitutes the outboard side wall 18, are continuous at the rear end. This base member 42 is folded into two and joined (sewn up) at the outer peripheral edge except the rear edge to form the bag body 16.

Figure 7:
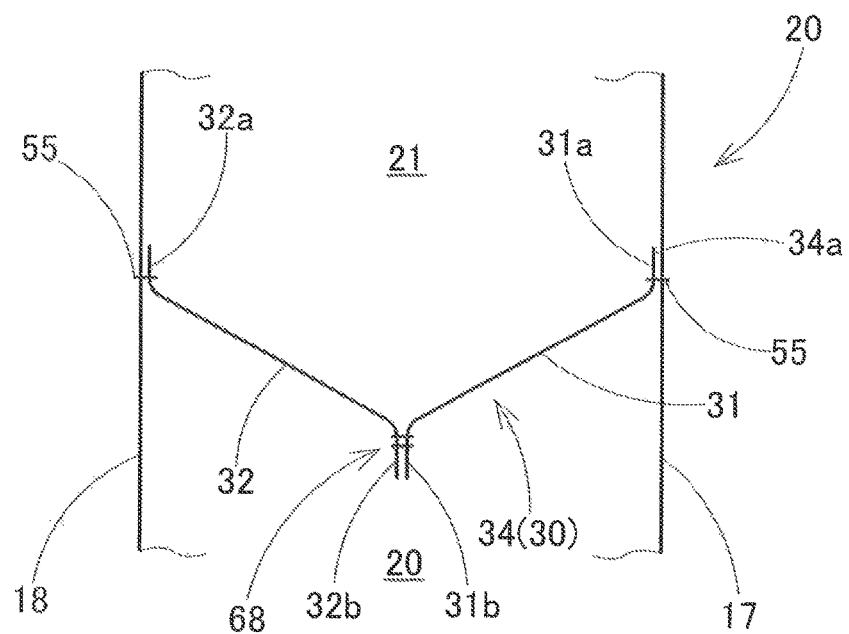
FIG. 7 is a sectional view taken along line VII-VII of FIG. 3.

As shown in FIGS. 3 and 23, the bag body 16 includes a pelvis protecting portion 20 which is located at the lower end 16b region of the bag body 16 at full deployment for protecting the pelvis H of the occupant P and a thorax protecting portion 21 which is located above the pelvis protecting portion 20 for protecting the thorax B of the occupant P. In the illustrated embodiment, the pelvis protecting portion 20 as fully inflated is wider in a front and rear direction than the thorax protecting portion 21 in order to protect the pelvis H in an adequate fashion. The thorax protecting portion 21 is elongated in an up and down direction for covering the thorax B and the shoulder S of the occupant P. As shown in FIGS. 3 and 7, in the illustrated embodiment, the pelvis protecting portion 20 and the thorax protecting portion 21 are partitioned from each other by the partition wall 30. In the illustrated embodiment, moreover, each of the pelvis protecting portion 20 and the thorax protecting portion 21 is provided with a vent hole 25/26 (FIG. 3) for exhausting an extra inflation gas. The vent hole 25 of the thorax protecting portion 21 is composed of an opening formed at a front lower region of the outboard side wall 18. The vent hole 26 of the pelvis protecting portion 20 is composed of a gap of a peripheral joint 63 joining the inboard side wall 17 and outboard side wall 18. In the illustrated embodiment, the vent hole 26 is formed at a front lower region of the pelvis protecting portion 20, between a later-described front region 65 and a lower region 64.

In the bag body 16 of the illustrated embodiment, the region of the inboard side wall 17 in a vicinity of the rear lower end of the thorax protecting portion 21 serves as a mounting region 22 to be mounted on the seat frame 3 with the aid of the inflator 10. As shown in FIG. 8, the mounting region 22 is provided with two mounting holes 22a disposed one above the other for receiving the mounting bolts 12b of the inflator 10. Further, an insert opening 23 is formed at the upper end region of the mounting region 22 (in other words, in a vicinity of the center in an up and down direction of the rear end of the thorax protecting portion 21) for inserting the inflator 10 there from. The insert opening 23 of the illustrated embodiment is composed of a slit 45 extending generally along a left and right direction in a vicinity of the center in a left and right direction of the base member 42, as shown in FIG. 8. More specifically, when the base member 42 is doubled to form the bag body 16, the crease VI of the double-folding of the region 42c above the slit 45 is invaginated inside as shown in FIG. 3, thus the slit 45 forms the insert opening 23 from which the inflator 10 is inserted.

Figure 5:
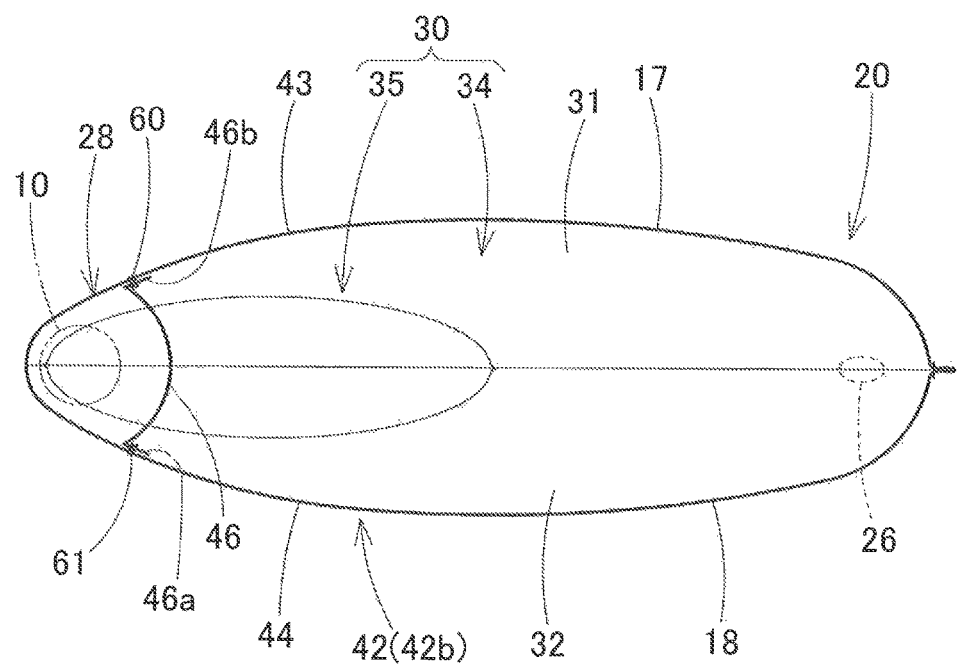
FIG. 5 is a sectional view taken along line V-V of FIG. 3.

The mounting region 22 is further provided with an inner tube 28 for covering an outer circumference of the inflator 10. The inner tube 28 is formed by joining (or sewing) a generally rectangular base member 46 (FIG. 8) to the inboard side wall 17 and outboard side wall 18 of the bag body 16. Specifically, both edges 46a and 46b in a width direction of the base member 46 are wholly joined to the regions of the inboard side wall 17 and the outboard side wall 18 to form the mounting region 22, thereby forming an inner joint 60 and an outer joint 61. That is, the inner tube 28 is composed of the base member 46 and regions of the inboard side wall 17 and outboard side wall 18 between the inner joint 60 and the outer joint 61, and forms a generally tube, as shown in FIGS. 5 and 8. More specifically, the base member 46 of the inner tube 28 is sewn to the base member 42 of the bag body 16 such that the center in a left and right direction of the inner-tube base member 46 generally coincides with the center in a left and right direction of the bag-body base member 42. Moreover, as shown in FIG. 23, the inner tube 28 is so formed as to cover an area from a generally center in an up and down direction of the inflator 10 up to an under area of the small diameter portion 11*b*, so as to cover the small diameter portion 11*b* or gas discharge ports 11*e*. The inner joint 60 and outer joint 61 are so formed as to extend farther downwardly than a later-described upper joint 55 which sews the partition wall 30 to the bag-body base member 42, as shown in FIG. 8. As shown in FIG. 23, the lower end 28*a* of the inner tube 28 is located immediately above a later-described communication region 35 of the portion wall 30 so as to direct an inflation gas G discharged from the gas discharge ports 11*e* of the inflator 10 downwardly and towards the pelvis protecting portion 20.

Figure 6:
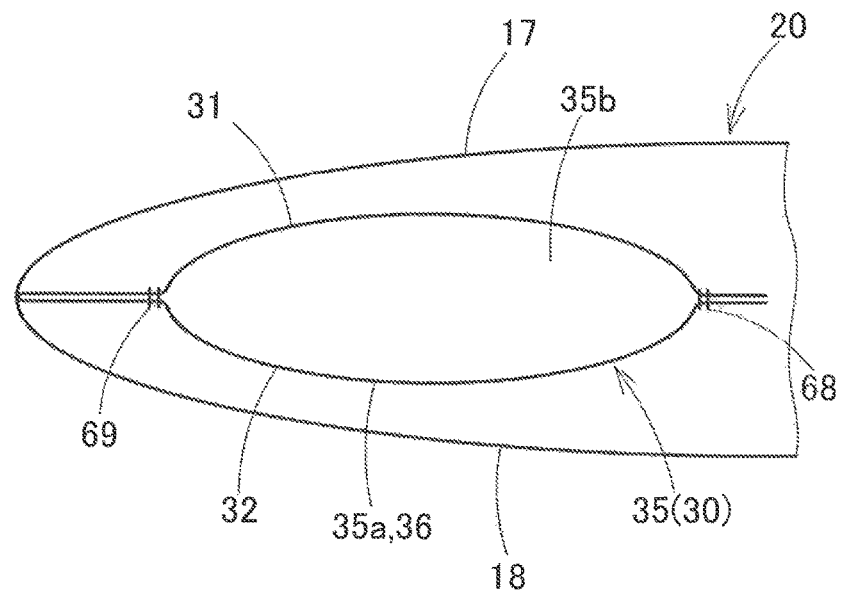
FIG. 6 is a sectional view taken along line VI-VI of FIG. 3.

The partition wall 30 is arranged along a front and rear direction inside the bag body 16 as inflated for partitioning the pelvis protecting portion 20 from the thorax protecting portion 21. As shown in FIGS. 3, 6 and 7, the partition wall 30 of the illustrated embodiment includes a wall body 34 and a communication region 35 for providing gas communication between the pelvis protecting portion 20 and thorax protecting portion 21. The communication region 35 is provided with a check valve 36. The wall body 34 partitions the pelvis protecting portion 20 from thorax protecting portion 21 by being joined (or sewn) to the inboard side wall 17 and outboard side wall 18 by a generally entire outer edge 34*a*. The communication region 35 is located in a vicinity of the rear end of the bag body 16 as deployed, below the mounting region 22.

More specifically, referring to FIGS. 6, 7 and 8, the partition wall 30 is composed of a band-shaped base member 47 having such a shape that an inboard side region 31, which is disposed on the part of the inboard side wall 17, and an outboard side region 32, which is disposed on the part of the outboard side wall 18, are continuous at the rear end. The inboard side region 31 and outboard side region 32 are identical in outer contour, and each widens towards the rear end. The upper edges 31*a* and 32*a* of the inboard side region 31 and outboard side region 32 are entirely joined (sewn) to the inboard side wall 17 and outboard side wall 18 by an upper joint 55, thus the outer edge 34*a* of the wall body 34 is generally entirely joined (sewn) to the inboard side wall 17 and outboard side wall 18, as shown in FIGS. 3 and 7. Further, the front edge 34*b* of the wall body 34 (i.e., the front edges 31*c* and 32*c* of the inboard side region 31 and outboard side region 32) is entirely sewn together with the inboard side wall 17 and outboard side wall 18 at the front region 65 of the peripheral joint 63 which constitutes the outer peripheral edge of the bag body 16. Thus the front edge 34*b* of the wall body 34 is joined to the bag body 16.

The lower edges 31*b* and 32*b* of the inboard side region 31 and outboard side region 32 of the partition wall 30 is partially joined (sewn) together, which provides a communication region 35 and a check valve 36 at the lower edge of the partition wall 30. Specifically, as shown in FIGS. 3 and 23, the lower edges 31*b* and 32*b* of the inboard side region 31 and outboard side region 32 are joined (sewn) together in a matched state by a front seam 68 which extends from the front edge region of the bag body 16 (or from the front region 65 of the peripheral joint 63) and a rear seam 69 which extends from the rear edge region of the bag body 16. The region formed between the front seam 68 and rear seam 69 serves as the communication region 35. Even more specifically, the front seam 68 is so formed as to extend rearward generally along a front and rear direction from the front region 65 of the peripheral joint 63 and to intersect with the front region 65. The leading end region of the front seam 68 is turned over at the generally center in a front and rear direction of the partition wall 30 such that the leading end 68*a* points to an obliquely forward and downward direction. The rear seam 69 extends obliquely forward and downwardly from the rear edge region of the bag body 16 in a generally straight fashion. Further, the rear seam 69 is formed generally in parallel to the leading end 68*a* of the front seam 68 in such a manner as to form a gap between itself and the front seam 68. That is, the region defined by the front seam 68, rear seam 69, inboard side region 31 and outboard side region 32 forms a generally tube which is open at the top and bottom and extends obliquely forward and downwardly, and this region serves as the communication region 35 which provides gas communication between the thorax protecting region 21 and pelvis protecting region 20 and feeds an inflation gas G to the pelvis protecting region 20 via an opening 35*b* at the bottom, as shown in FIGS. 6 and 23. The regions of the inboard side region 31 and outboard side region 32 disposed between the leading end 68*a* of the front seam 68 and rear seam 69 constitutes a circumferential wall 35*a* of the communication region 35. When the pelvis protecting portion 20 as inflated catches the pelvis H of an occupant P and is increased in internal pressure, these regions of the inboard side region 31 and outboard side region 32 are pressed against each other due to an increased internal pressure, thus the opening 35*b* at the bottom is closed. That is, the circumferential wall 35*a* of the communication region 35 forms the check valve 36 which prevents the inflation gas G inside the pelvis protecting portion 20 from flowing out into the thorax protecting region 21. Thus the check valve 36 will help keep the internal pressure of the pelvis protecting portion 20 such that the pelvis protecting portion 20 catches the pelvis H of an occupant P with a high internal pressure.

Figure 4:
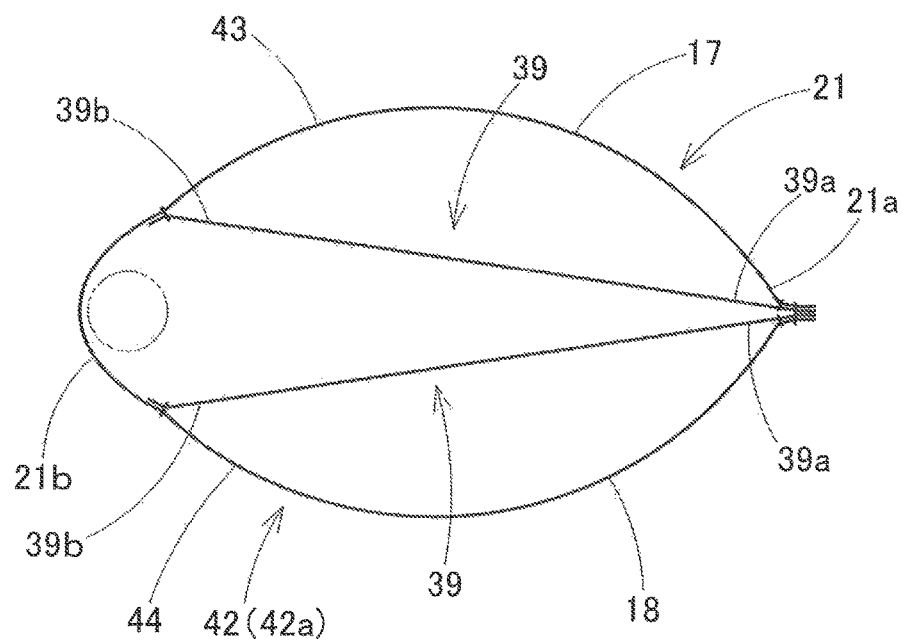
FIG. 4 is a sectional view taken along line IV-IV of FIG. 3.

A pair of regulating members 39 is disposed in the thorax protecting portion 21 for regulating the contour of the bag body 16 as fully inflated. As shown in FIGS. 3 and 4, each of the regulating members 39 of the illustrated embodiment is disposed inside the bag body 16 so as to reduce the width in a front and rear direction of the inboard side wall 17/outboard side wall 18 compared to the width as the inboard side wall 17/outboard side wall 18 are flatly developed (i.e., the width as the inboard side wall 17 and outboard side wall 18 are not provided with the regulating members 39). The regulating members 39 have an identical outer contour like a generally band extending generally along a front and rear direction, and are disposed in a vicinity of the center in an up and down direction of the thorax protecting portion 21, above and remote from the inner tube 28. More specifically, the front edge 39*a* and rear edge 39*b* of each of the regulating members 39 are sewn (joined) to the front end 21*a* region and rear end 21*b* region of the thorax protecting portion 21 (i.e., to the inboard side wall 17 and outboard side wall 18) with sewing threads by the front joint 57 and rear joint 58, in such a state as to be laid over the inner circumferential plane of the bag body 16. Referring to FIG. 8, the distance L1 between the positions at which the front joint 57 and rear joint 58 are to be formed in each of the regulating members 39 as flatly developed is smaller than the distance L2 between the positions at which the front joint 57 and rear joint 58 are to be formed on the part of the bag-body base member 42 as flatly developed. In the airbag 15 provided with the regulating members 39, the width in a front and rear direction of the thorax protecting portion 21 is already reduced by the regulating members 39, and therefore, the thorax protecting portion 21 has a smaller width in a front and rear direction than the pelvis protecting portion 20. When the airbag 15 of the illustrated embodiment is fully inflated, the regulating members 39 are deployed straightly in a tense fashion in a cross-section taken along a front and rear direction inside the airbag 15. Therefore, the thorax protecting portion 21 is reduced in width in a front and rear direction and is inflated thickly to an outboard and an inboard directions, as shown in FIG. 4.

As shown in FIG. 8, the airbag 15 of the illustrated embodiment includes the bag-body base member 42 forming the bag body 16, the inner-tube base member 46, the base member 47 forming the partition wall 30 and the regulating members 39. The airbag 15 further includes a reinforcing cloth 50 for reinforcing a periphery of the vent hole 25 which is disposed at the front lower end region of the thorax protecting portion 21. The bag-body base member 42, the base member 46, the base member 47, the regulating members 39 and the reinforcing cloth 50 are formed of a flexible woven fabric woven with polyester yarns, polyamide yarns or the like. As described above, in the bag body 16, the thorax protecting portion 21 is provided with the regulating members 39, thus has a smaller width in a front and rear direction than the pelvis protecting portion 20. However, as shown in FIG. 8, in the bag-body base member 42 as is developed in a flat fashion, the upper region 42a for forming the thorax protecting portion 21 has the generally same width in a front and rear direction as the lower region 42b for forming the pelvis protecting portion 20.

Figure 12:
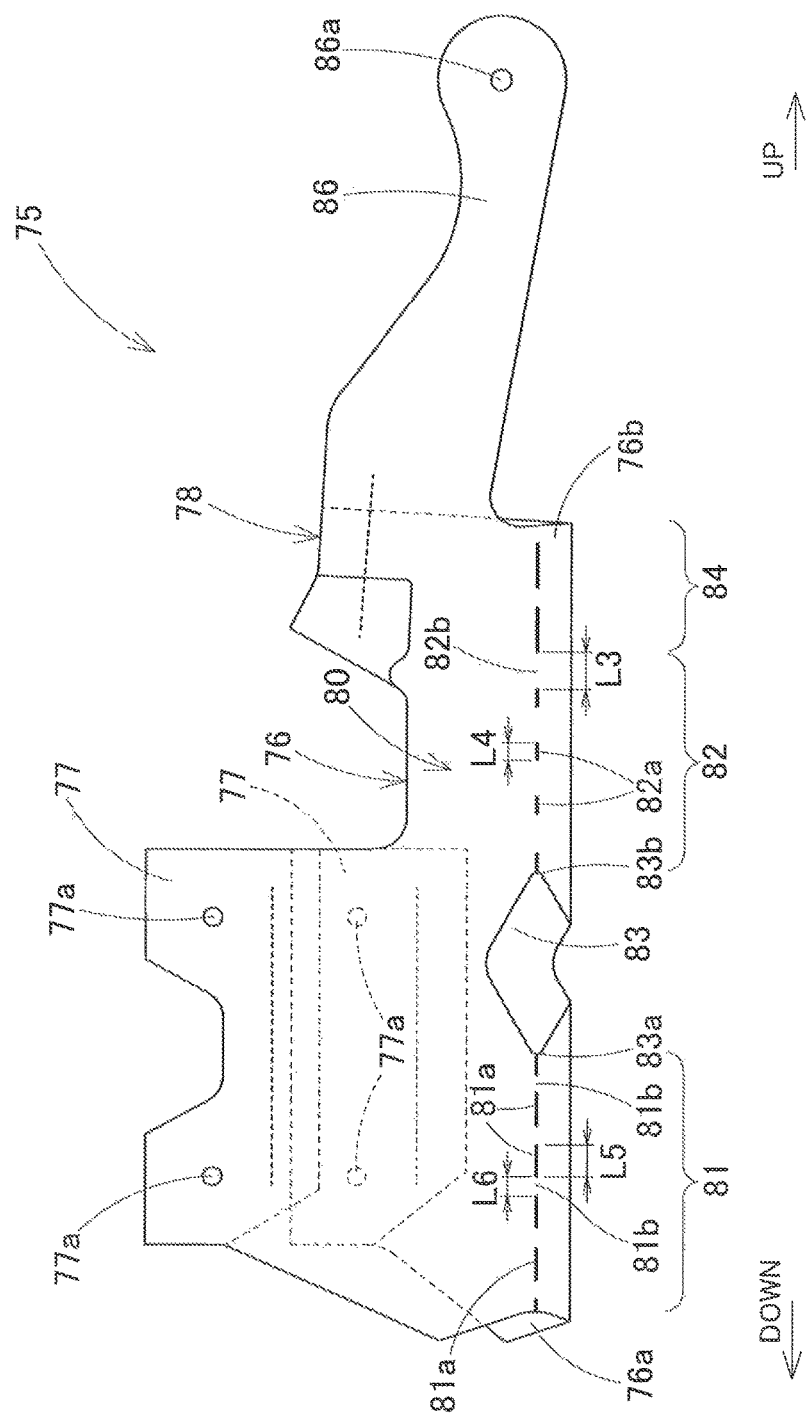
FIG. 12 is a front elevation of a wrapping member for use in the airbag device of the embodiment.

The wrapping member 75 which wraps the airbag 15 as folded up into the form of the folded-up body 107 is composed of a flexible sheet member. The wrapping member 75 is mounted around the folded-up body 107 for keeping the folded-up configuration of the folded-up body 107. The wrapping member 75 of the illustrated embodiment is formed of a flexible woven fabric woven with polyester yarns, polyamide yarns or the like, in a similar fashion to the airbag 15. As shown in (C) of FIG. 19, the wrapping member 75 is disposed around the folded-up body 107 except the lower end region 107a, more specifically, except a later-described severalfold region 108 located at the lower end region 107a of the folded-up body 107. As shown in FIG. 12, the wrapping member 75 includes a main body 76 which is mounted around the folded-up body 107 and a joint region 86 extending from the main body 76.

Figure 19:
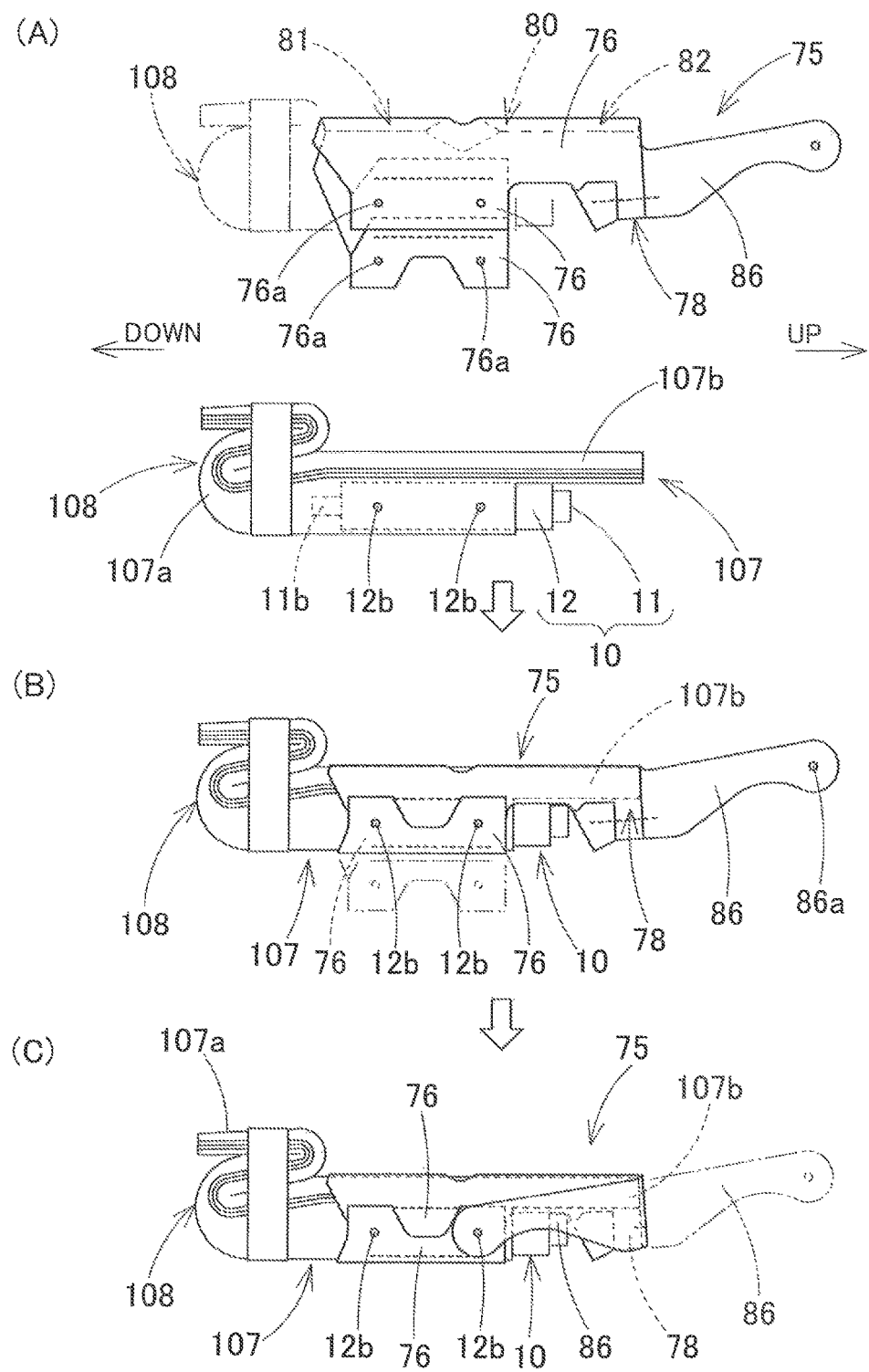
FIG. 19 schematically illustrates the process of mounting the wrapping member around the folded-up airbag.

The main body 76 is designed to cover a generally entire region of the folded-up body 107 except the severalfold region 108 located at the lower end region 107a of the folded-up body 107, as shown in (C) of FIG. 19. The main body 76 includes, at the opposite end regions, a pair of mounting regions 77 at which the wrapping member 75 is fixed to the folded-up body 107 with the aid of the mounting bolts 12b of the retainer 12 protruding out of the folded-up body 107. Each of the mounting regions 77 is provided with two mounting holes 77a for receiving one of the mounting bolts 12b of the retainer 12. As shown in FIG. 12, in a flatly developed state of the wrapping member 75, the joint region 86 extends upwardly from the upper end of the main body 76, and is provided with a through hole 86a for receiving one of the mounting bolts 12b at the leading end region. As shown in (C) of FIG. 19, the joint region 86 is so folded back as to cover the end edge of the upper end 107b region and the upper end 107b region of the folded-up body 107, and one of the mounting bolts 12b is inserted through the through hole 86a. Further, the main body 76 includes, at the upper end region in a vicinity of the joint region 86, a tubular region 78 which is formed into a tube partially for receiving the folded-up body 107. The tubular region 78 covers an outer circumference of the upper end 107b region of the folded-up body 107. The tubular region 78 facilitates the mounting work of the wrapping member 75 on the folded-up body 107 by inserting the upper end region 107b of the folded-up body 107 into the tubular region 78.

The airbag 15 of the illustrated embodiment, in the form of the folded-up body 107, includes the severalfold region 108 which is composed of a region disposed below the inflator 10 (or retainer 12), i.e., the pelvis protecting portion 20, as shown in FIGS. 17 and 18. The wrapping member 75 is so mounted around the folded-up body 107 as to let the pelvis protecting portion 20 which is disposed at the lower end 107a region (i.e., at least at one end region in an up and down direction) be exposed while covering the thorax protecting portion 21 disposed at the upper end 107b region, as shown in (C) of FIG. 19.

Further, as shown in FIG. 12, the main body 76 includes, at such a position that is disposed at the front face of the folded-up body 107 as mounted on board, a tearable region 80 that is tearable at airbag deployment. The tearable region 80 extends generally along an up and down direction. More specifically, when the airbag device M is mounted on board, the tearable region 80 is disposed at the generally center of the front face of the folded-up body 107. When a later-described base member 89 of the wrapping member 75 is developed in a flat fashion, the tearable region 80 is disposed slightly towards an inboard direction (towards the left, in the illustrated embodiment) with respect to the center in a left and right direction (i.e., in an in- and outboard direction) of the main body 76, as shown in (A) of FIG. 13. Further, the tearable region 80 is formed over an entire region in an up and down direction of the main body 76.

As shown in FIG. 12, the tearable region 80 includes a low-strength region 81 which has a low breaking strength, a high-strength region 82 which has a high breaking strength, and an opening 83 which is disposed between the low-strength region 81 and the high-strength region 82. The opening 83 serves as a starting point of tearing of each of the low-strength region 81 and the high-strength region 82. As shown in (A) of FIG. 13, the opening 83 is formed into a generally rhombus elongated in an up and down direction and is disposed slightly below the center in an up and down direction of the main body 76. Moreover, the opening 83 is continuous with the low-strength region 81 and the high-strength region 82 by the upper and lower tops 83a and 83b of the rhombus. More specifically, each of the low-strength region 81 and the high-strength region 82 is composed of later-described roulettes 81a/ 82a, and the roulettes 81a and 82a facing the opening 83 are continuous with the opening 83. In the illustrated embodiment, since the opening 83 is formed into a generally rhombus elongated in an up and down direction and thus the upper and lower tops 83a and 83b of the opening 83 continuous with the low-strength region 81 and the high-strength region 82 form acute angles, a stress concentration is likely to occur on the tops 83a and 83*b*. Therefore, the opening 83 helps tear the low-strength region 81 and the high-strength region 82 smoothly starting the tops 83*a* and 83*b*.

In the illustrated embodiment, each of the low-strength region 81 and the high-strength region 82 is formed by rouletting the base member 89 of the wrapping member 75 intermittently so as to form a plurality of slits or roulettes 81*a*/82*a*. By varying the length of each of the roulettes 81*a*/82*a* and the distance in between the roulettes 81*a*/82*a* (i.e., the width of a between-roulettes region 81*b*/82*b*), between the roulettes 81*a* and 82*a*, the breaking strength of each of the low-strength region 81 and the high-strength region 82 are adjusted. In the low-strength region 81, the length of each of the roulettes 81*a* is long, and the width of the between-roulettes region 81*b* is small, thus the low-strength region 81 has a low breaking strength. In the high-strength region 82, the length of each of the roulettes 82*a* is shorter and the width of the between-roulettes region 82*b* is greater than in the low-strength region 81, thus the high-strength region 82 has a higher breaking strength than the low-strength region 81. More specifically, in the illustrated embodiment, as shown in FIG. 12, the width L3 of the between-roulettes region 82*b* of the high-strength region 82 is about one-and-a-half times greater than the length L4 of each of the roulettes 82*a*, i.e., greater than the length of each of the roulettes 82*a*. In the low-strength region 81, the length L5 of each of the roulettes 81*a* is about twice as great as the length L4 of the roulette 82*a* in the high-strength region 82, and the width L6 of the between-roulettes region 81*b* is about half of the length L5 of each of the roulettes 81*a*, i.e., smaller than the length L5 of each of the roulettes 81*a*.

In the illustrated embodiment, the low-strength region 81 is formed in a region below the opening 83, up to the lower edge 76*a* of the main body 76. That is, as shown in (A) of FIG. 19, the low-strength region 81 is disposed proximate the severalfold region 108 (i.e., the lower end 107*a* region of the folded-up body 107) protruded out of the main body 76. The high-strength region 82 is located in a region above the opening 83. More specifically, the high-strength region 82 is formed only in a region of the main body 76 except the tubular region 78 (i.e., in a region between the opening 83 and tubular region 78). As shown in FIG. 12, there is formed a normal tearable region 84 in the tubular region 78 in such a manner as to extend from the high-strength region 82 to the upper edge 76*b* of the main body 76. The roulettes of the normal tearable region 84 each has an even longer length than those of the low-strength region 81, thus the normal tearable region 84 has a lower breaking strength than the low-strength region 81, such that the tearing of the high-strength region 82 propagates to the normal tearable region 84 quickly to break the tubular region 78.

In an initial stage of airbag deployment, each of the low-strength region 81 and high-strength region 82 starts to tear from the part of the opening 83, and the tearing of the high-strength region 82 propagates to the normal tearable region 84 disposed above the high-strength region 82, thus breaking and opening the main body 76 except the tubular region 78 in an in- and outboard directions. In the illustrated embodiment, since the lower edge 76*a* of the main body 76 is provided with a slit, the low-strength region 81 starts to tear from the lower edge 76*a* of the main body 76 as well. That is, the low-strength region 81 tears from both upper and lower ends, thus tears all over quickly.

Figure 13:
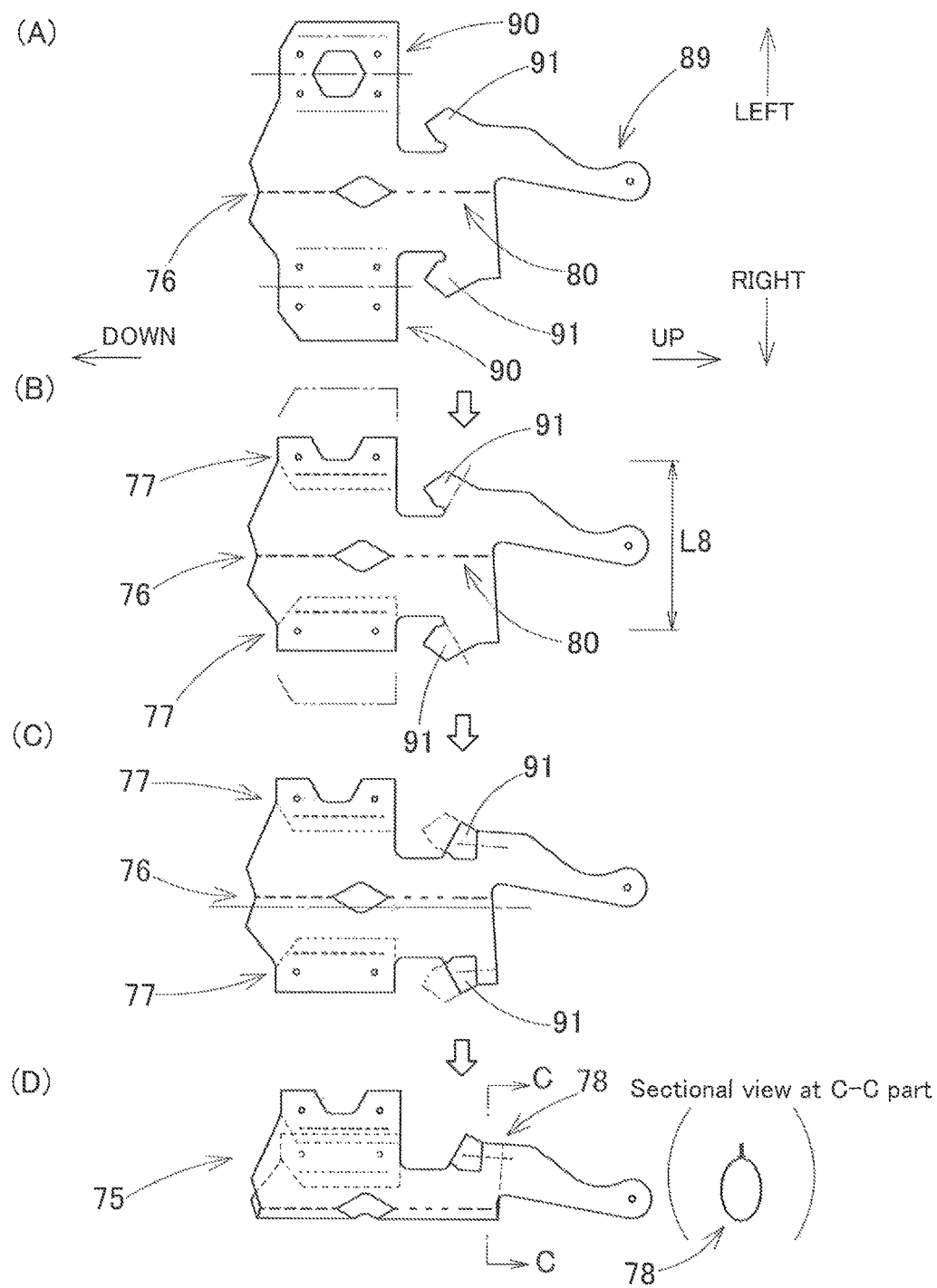
FIG. 13 schematically illustrates the production process of the wrapping member of FIG. 12.

The wrapping member 75 is composed of a base member 89 shown in (A) of FIG. 13. The base member 89 includes a pair of mounting-region forming regions 90 on the opposite sides, each of which is doubled to form the mounting region 77. The base member 89 further includes a pair of reinforcing regions 91 for reinforcing the lower end region of the tubular region 78. Each of the mounting-region forming regions 90 is doubled and sewn up with sewing threads as shown in (B) of FIG. 13, thus forming the mounting regions 77. Then the reinforcing regions 91 are also doubled in an identical outer contour, and the whole base member 89 is doubled as shown in (C) of FIG. 13. Then the regions to form the tubular region 78 including the reinforcing regions 91 are sewn up with sewing threads, thus forming the tubular region 78 and completing the wrapping member 75 as shown in (D) of FIG. 13.

Figure 14:
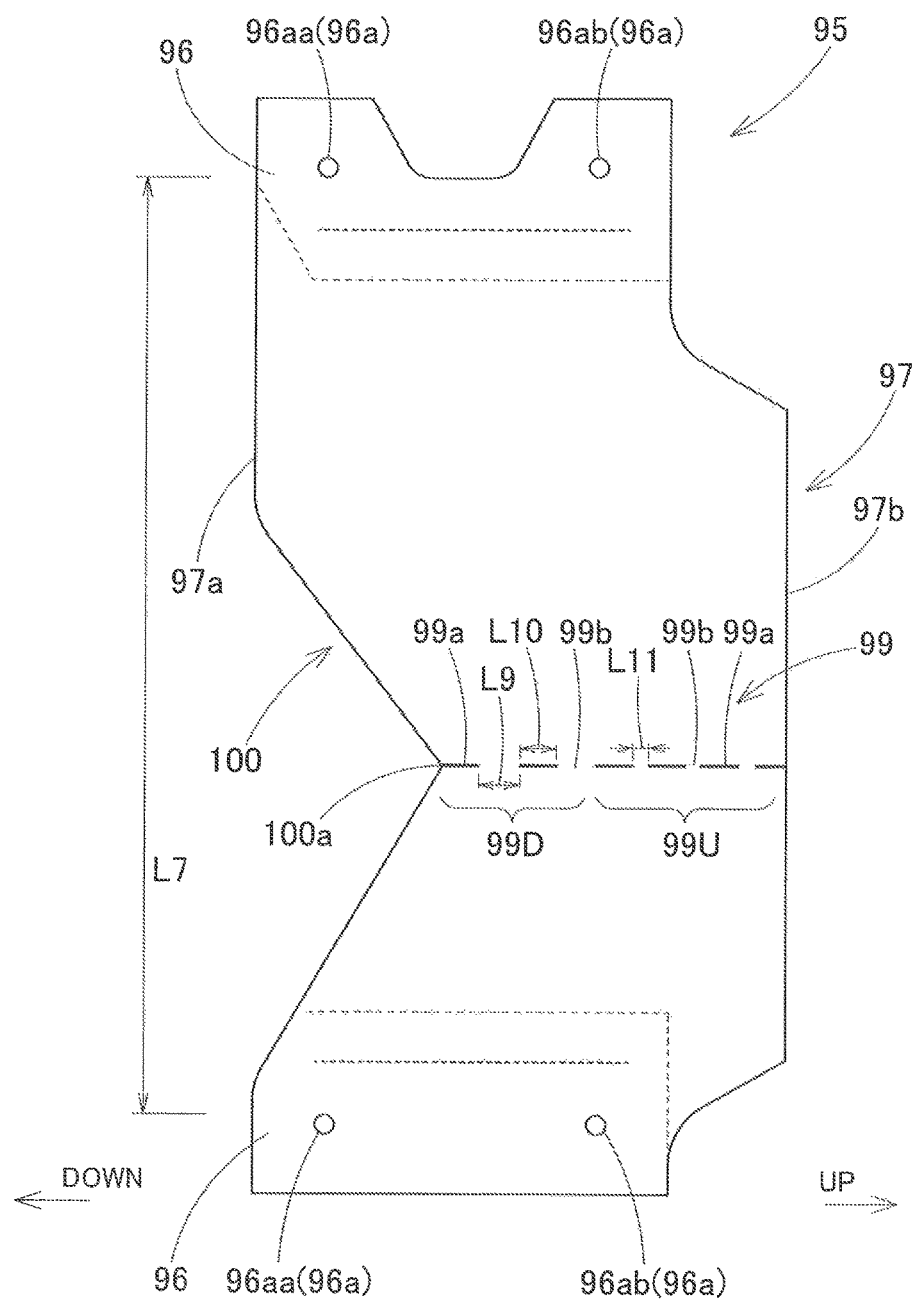
FIG. 14 is a plan view of a limitation member for use in the airbag device of the embodiment in a flatly developed state.

The limitation member 95 is disposed around the folded-up body 107 which is wrapped up by the wrapping member 75. The limitation member 95 is formed of a flexible sheet member into a band shape as shown in FIG. 14. The limitation member 95 of the illustrated embodiment is formed of a flexible woven fabric woven with polyester yarns, polyamide yarns or the like, in a similar fashion to the airbag 15 and wrapping member 75. The limitation member 95 includes, at opposite ends, a pair of joint regions 96, and is mounted on the folded-up body 107 by the joint regions 96. The region disposed between the joint regions 96 serve as a loose region 97 which is disposed remote from the folded-up body 107. In other words, the loose region 97 is disposed around the folded-up body 107 in a loose fashion. The joint regions 96 are each provided with through holes 96*a* for receiving the mounting bolts 12*b* of the retainer 12. In the illustrated embodiment, as shown in FIG. 2 and (E) of FIG. 20, the limitation member 95 is mounted around the main body 76 of the wrapping member 75 which covers the folded-up body 107, thus is mounted around the folded-up body 107. More specifically, as shown in (E) of FIG. 20, the limitation member 95 of the illustrated embodiment is so located as to cover the region of the main body 76 of the wrapping member 75 below the tubular region 76.

The length of the loose region 97 of the limitation member 95 (i.e., the length between the joint regions 96, in other words, the distance L7 between the through holds 96*a*, see FIG. 14) is greater than the length of the outer circumference of the folded-up body 107, more specifically, in the illustrated embodiment, greater than the length of the outer circumference of the region of the folded-up body 107 wrapped up by the main body 76 of the wrapping member 75, and is shorter than the film length of the lower region of the thorax protecting portion 21 as inflated, which thorax protecting portion 21 corresponding to the loose region 97. More specifically, in the illustrated embodiment, the length of the loose region 97 (i.e., the distance L7 between the through holds 96*a*) is greater than the length of the main body 76 of the wrapping member 75 (i.e., the distance L8 between the mounting holes 77*a* of the mounting regions 77, see (B) of FIG. 13). Further, the length of the loose region 97 (i.e., the distance L7 between the through holds 96*a*) is shorter than a twofold value of the width L12 (FIG. 3) in a front and rear direction of the lower region of the thorax protecting portion 21 (i.e., the region below the regulating members 39) in a flattened state.

The loose region 97 is provided with a tearable region 99 which is tearable in such a manner as to split up the region between the joint regions 96 at airbag deployment. The tearable region 99 is disposed in a region of the loose region 97 to be disposed at a front side of the folded-up body 107, i.e., in a region of the loose region 97 in a direction which the folded-up body 107 protrudes towards at airbag deployment. More specifically, when the airbag 15 is inflated and unfolds the loose region 97 of the limitation member 95 in an initial stage of airbag deployment, the tearable region 99 is disposed at a generally center in a left and right direction of the front surface of the airbag 15. In a flatly developed state of the limitation member 95, the tearable region 99 is located slightly towards an outboard direction (towards the right, in the illustrated embodiment) with respect to the center in a left and right direction (i.e., in an in- and outboard direction) of the loose region 97.

Figure 20:
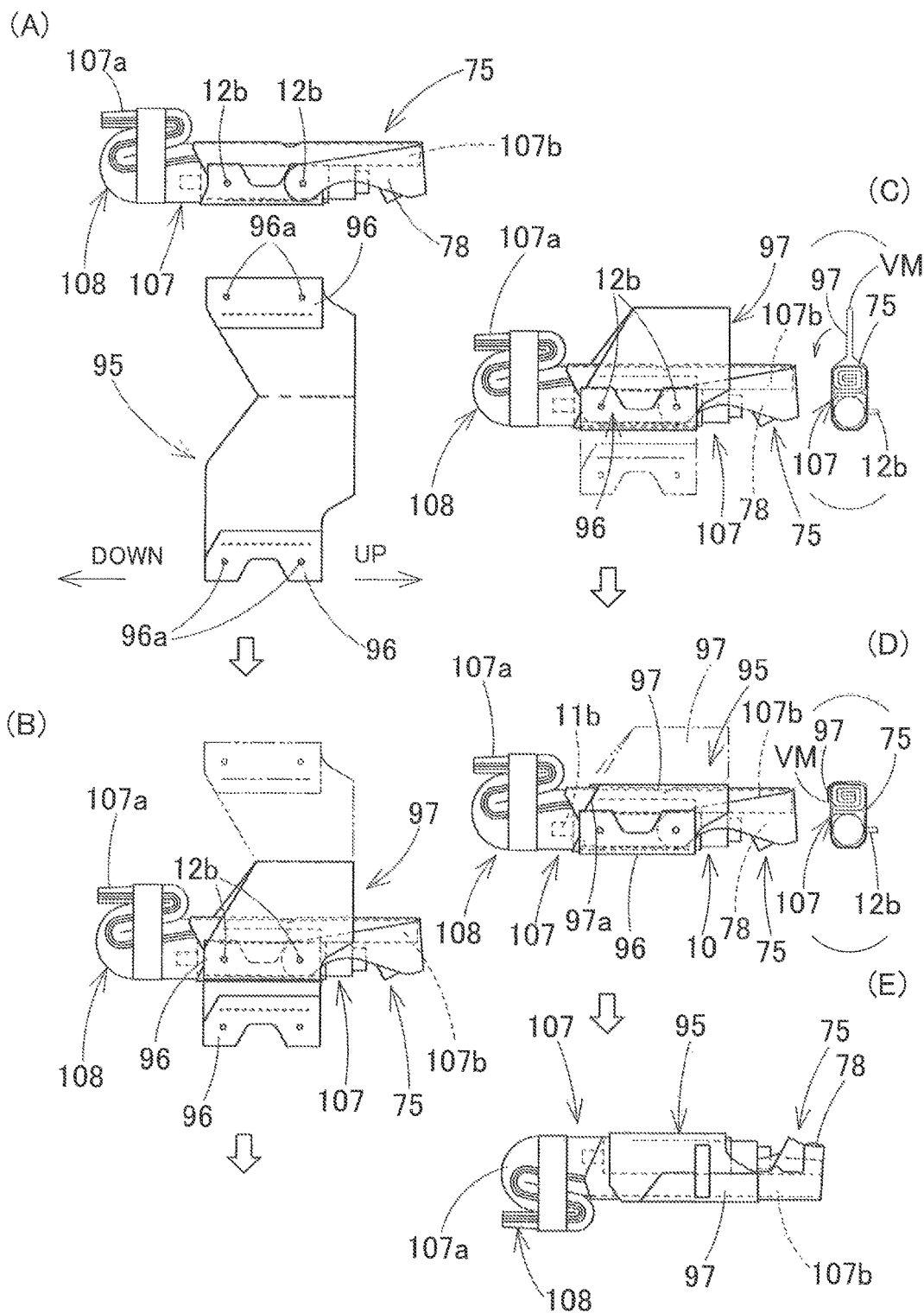
FIG. 20 schematically illustrates the process of mounting the limitation member around the folded-up airbag wrapped by the wrapping member.

As shown in (D) of FIG. 20, the lower edge 97a region of the loose region 97 is located in a vicinity of a front region of the gas discharge ports 11e (small diameter portion 11b) of the inflator 10. The lower edge 97a region of the loose region 97 is provided with a V-shaped cut-out region 100 which tapers towards the tearable region 99 (i.e., towards the center in a left and right direction or in an in- and outboard direction) of a flattened state, as shown in FIG. 14. The top 100a of the cut-out region 100 of the illustrated embodiment is disposed above the lower through hole 96aa, and the tearable region 99 extends upwardly from the top 100a. The cut-out region 100 constitutes the starting point of tearing of the tearable region 99. More particularly, the lowermost roulette 99a of the tearable region 99 is continuous with the cut-out region 100.

The tearable region 99 extends generally along an up and down direction from the cut-out region 100, over an entire area in an up and down direction of the loose region 97. The tearable region 99 is tearable in such a manner as to split up the region between the joint regions 96 at airbag deployment, as shown in (D) of FIG. 22 and FIG. 24. In the illustrated embodiment, the tearable region 99 is formed by rouletting the loose region 97 intermittently so as to form a plurality of slits or roulettes 99a. More specifically, the roulettes 99a have a uniform length, and the distances in between the roulettes 99a is great in a lower region proximate the cut-out region 100, while being smaller in an upper region remote from the cut-out region 100, as shown in FIG. 14. In further detail, the distance L9 between the roulettes 99a (i.e., the width of a between-roulettes region 99b) in the lower region 99D of the tearable region 99 (i.e., in a region below the upper through hole 96ab) is generally the same as the length L10 of each of the roulettes 99a, whereas the width L11 of a between-roulettes region 99b in the upper region 99U of the tearable region 99 (i.e., in a region above the upper through hole 96ab) is about a half of the length L10 of each of the roulettes 99a. That is, in the illustrated embodiment, the tearable region 99 has a high breaking strength in the lower region 99D which is proximate to the cut-out region 100, the starting point of tearing, while having a low breaking strength in the upper region 99U disposed in a lower reach of tearing.

Figure 16:
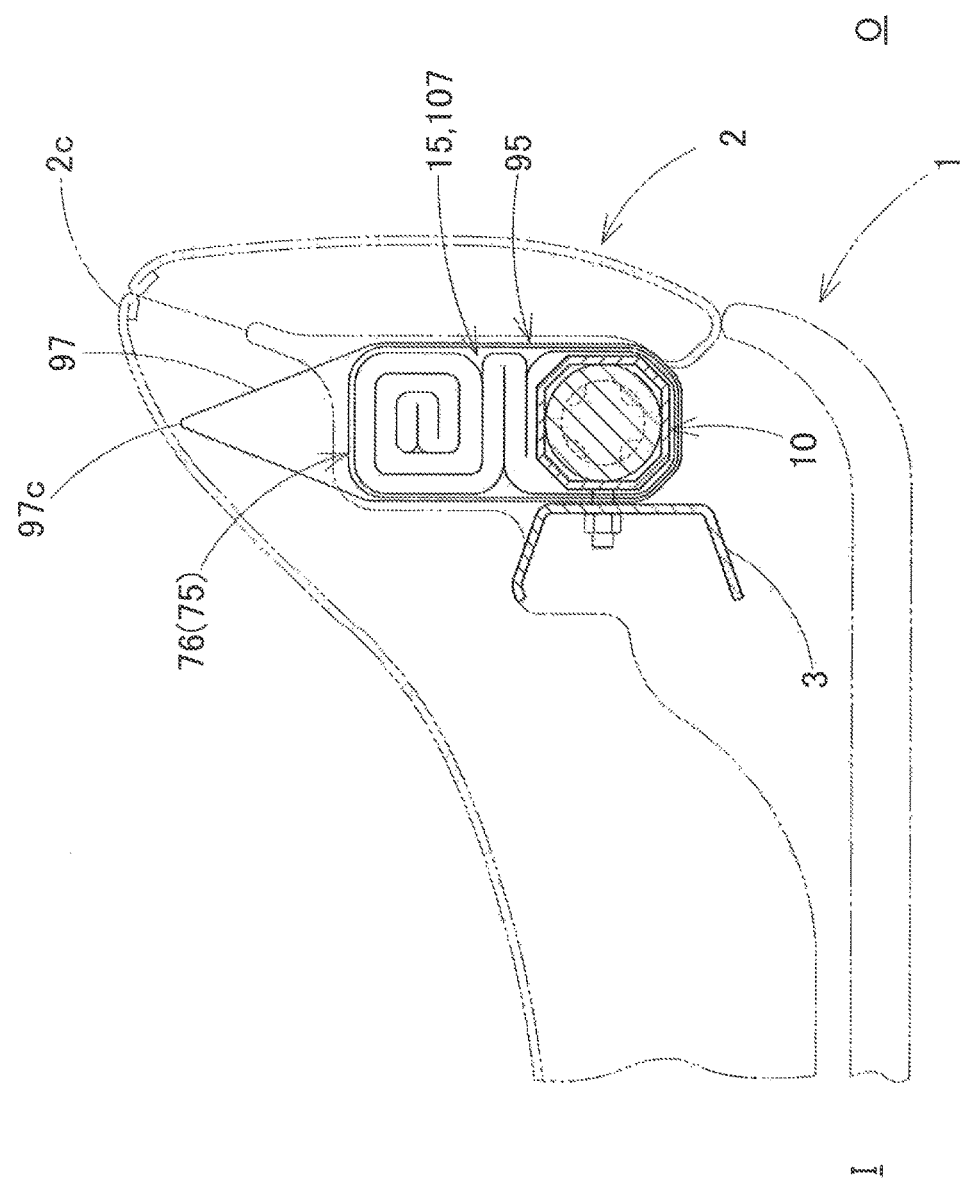
FIG. 16 is a schematic sectional view of the airbag device of the embodiment mounted on a vehicle sheet depicting a state in which a loose region of the limitation member disposed around a folded-up airbag is extended forward.
Figure 21:
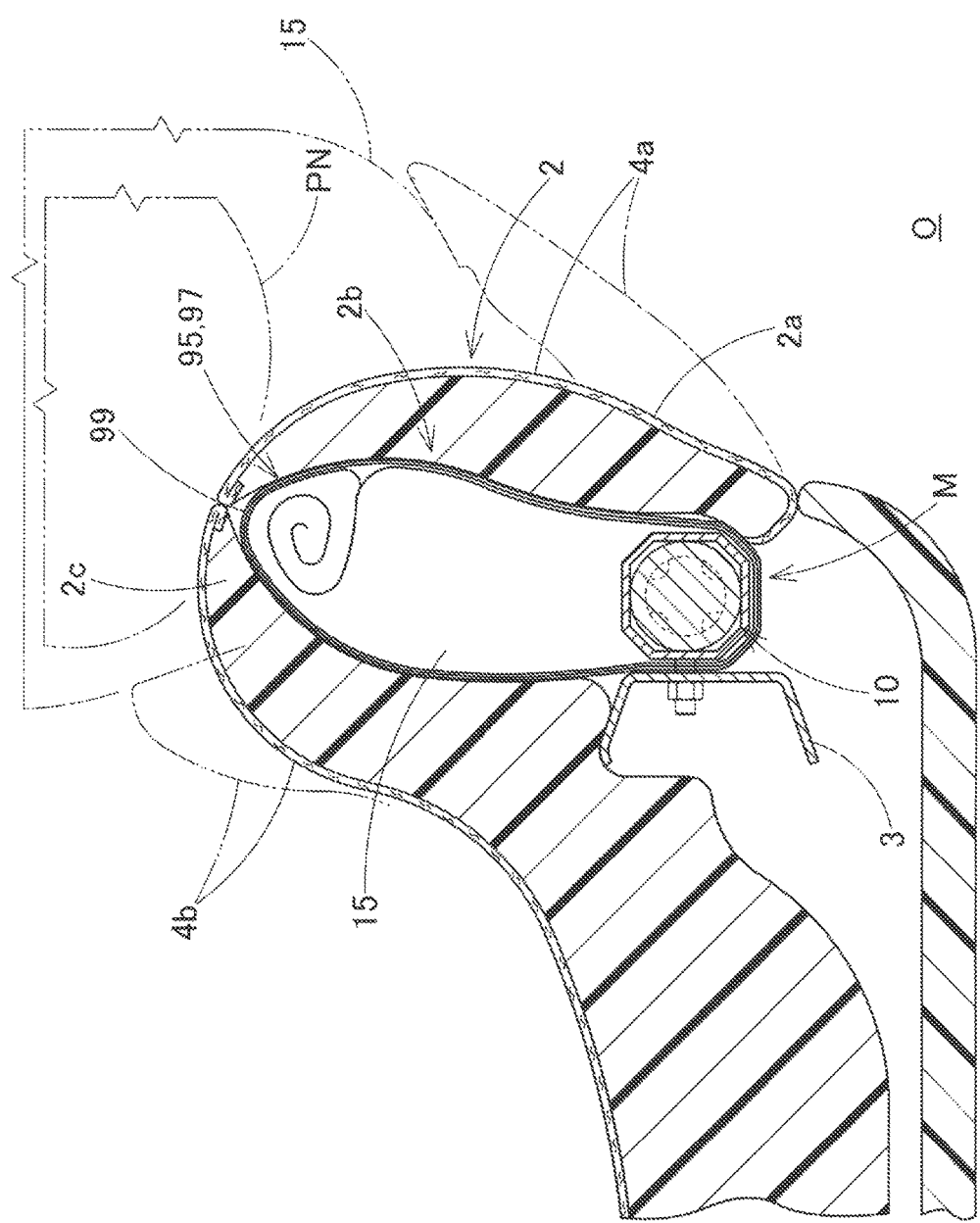
FIG. 21 is a schematic cross-sectional view of the airbag device of the embodiment mounted on the seat depicting the tearable region of the limitation member before being torn in an initial stage of airbag deployment.

The length of the loose region 97 of the limitation member 95 (i.e., the distance L7 between the through holes 96a) is configured such that the top 97c of the loose region 97 would be disposed at such a position as to correspond to a vicinity of the front end 2c of the back portion 2 of the seat 1 in a horizontal cross-sectional view depicting a situation in which the loose region 97 as mounted around the folded-up body 107 and mounted on the seat 1 is extended forward, as shown in FIG. 16. The airbag device M is so configured that the tearable region 99 formed on the loose region 97 is located inside the back portion 2 of the seat 1 before being torn in an initial stage of airbag deployment, as shown in FIG. 21. Further, in the illustrated embodiment, the loose region 97 is wrapped around the folded-up body 107 in a two-ply, or overlapped state. More specifically, as shown in FIGS. 2 and 20, the loose region 97, as the limitation member 95 is disposed around the folded-up body 107, is doubled at a mountain-fold crease VM in such a manner as to form an overlapped region, and the overlapped region is wrapped around the folded-up body 107. In the illustrated embodiment, the overlapped region of the loose region 97 is wrapped towards an outboard direction, as shown in FIG. 2.

Figure 15:
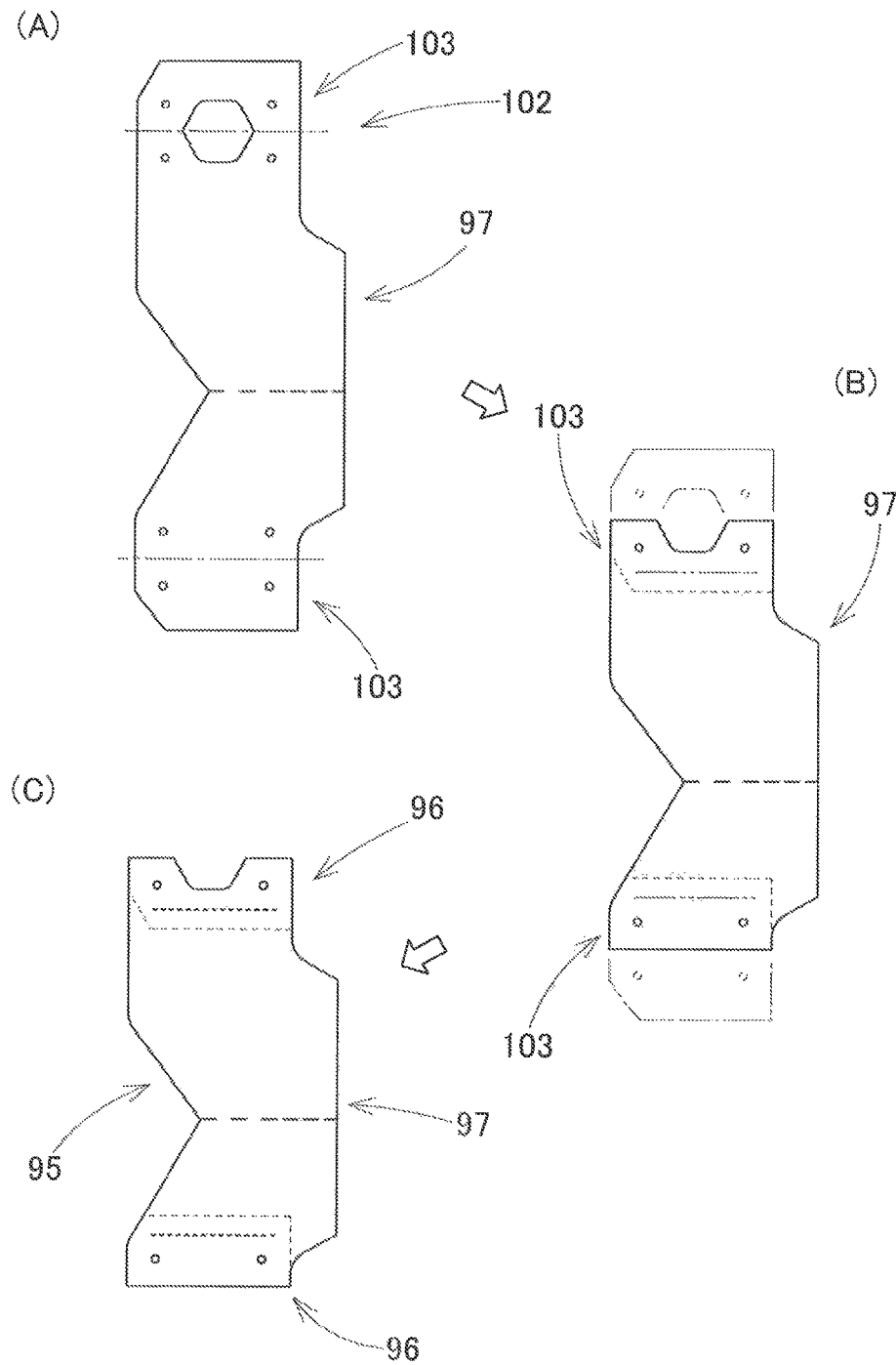
FIG. 15 schematically illustrates the production process of the limitation member of FIG. 14.

The limitation member 95 is formed of a base member 102 depicted in (A) of FIG. 15. The base member 102 includes a pair of joint-region forming regions 103 on opposite sides. As shown in (B) and (C) of FIG. 15. In the illustrated embodiment, the limitation member 95 is prepared by doubling each of the joint-region forming regions 103 and sewing the hems of the doubled regions with sewing threads to form the joint regions 96.

Figure 9:
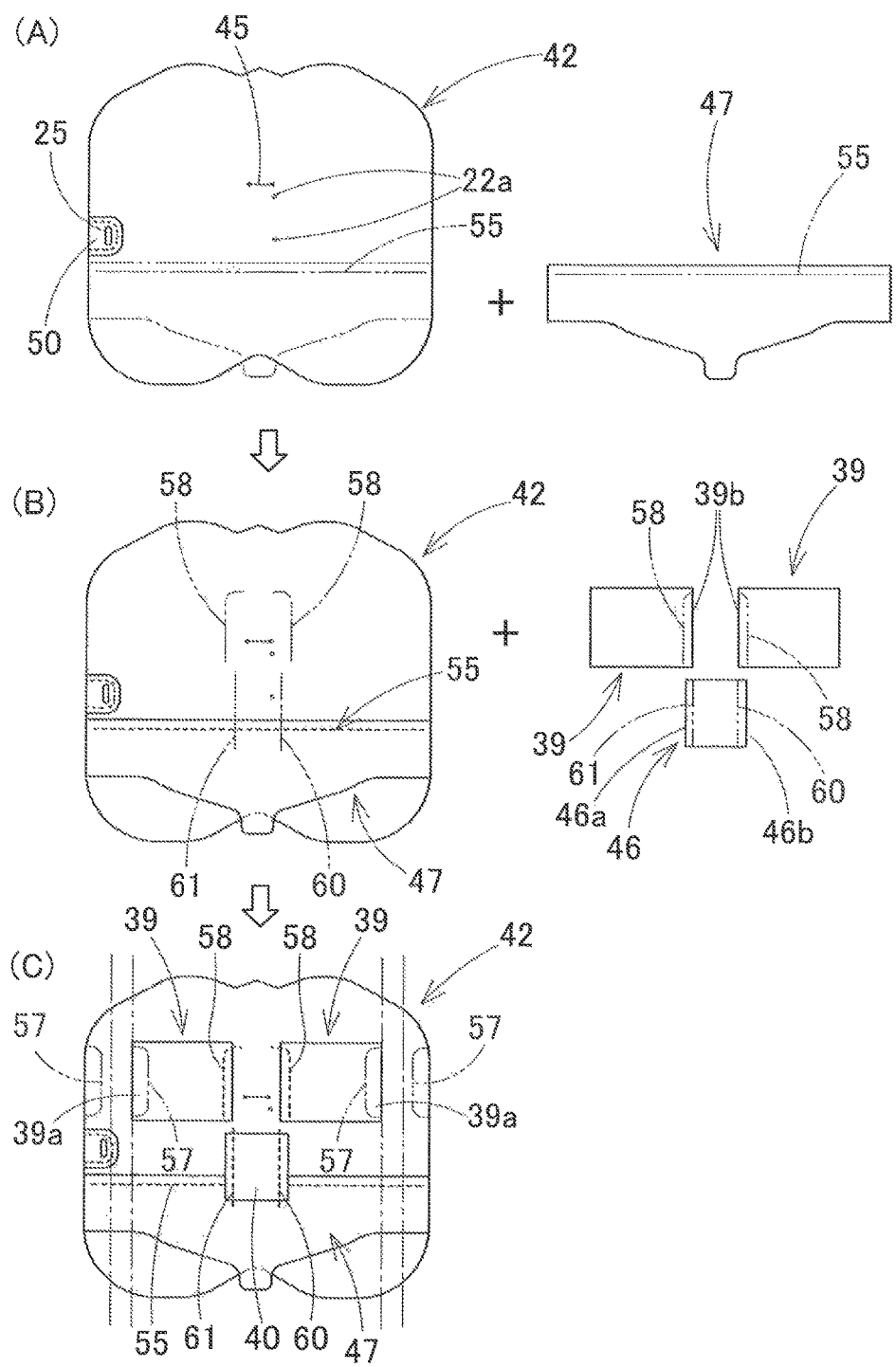
Figure 10:
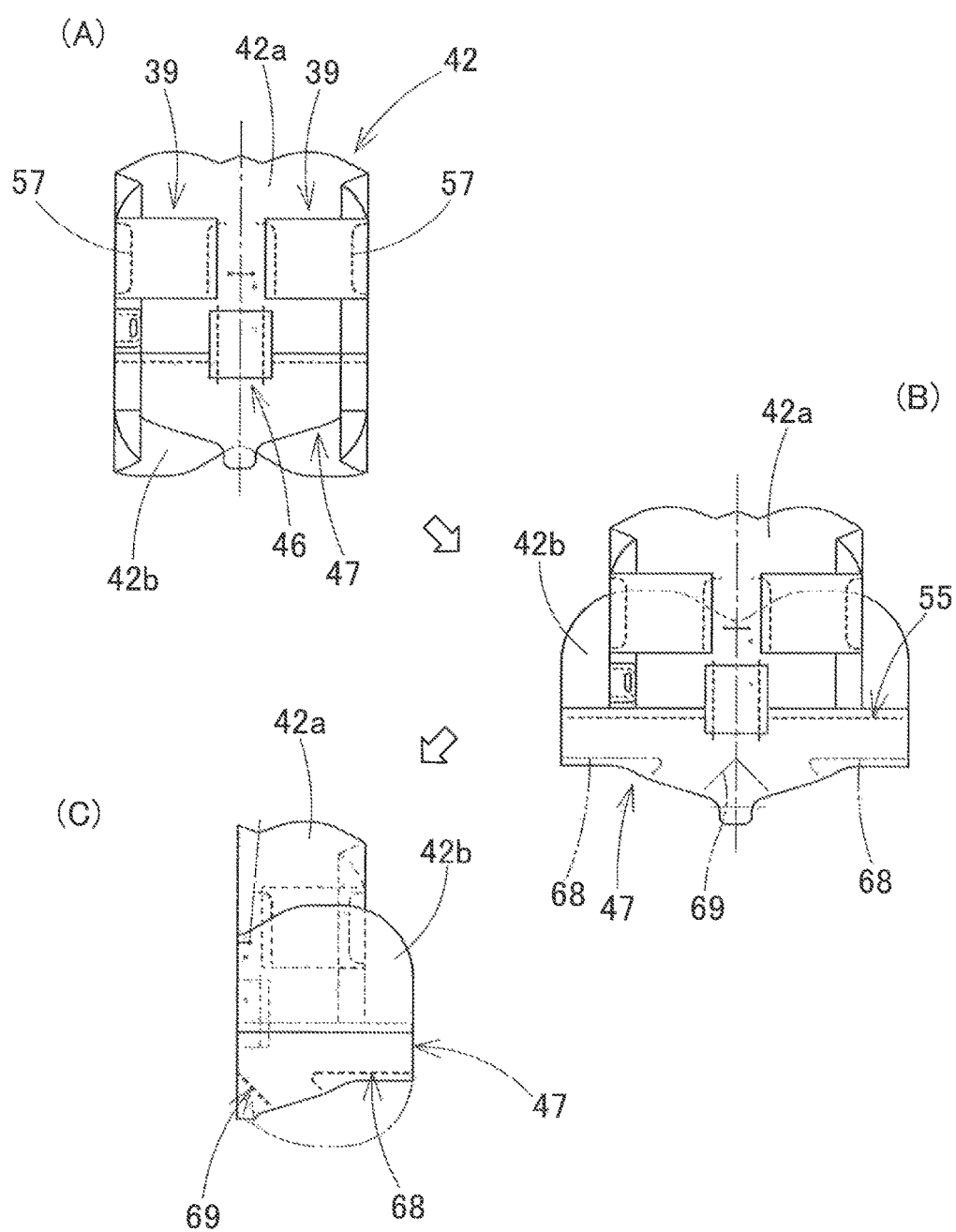

The production of the airbag 105 is now described. Referring to FIG. 8, in advance, the reinforcing cloth 50 is sewn to the base member 42 of the bag body 16, and the vent hole 25, the slit 45 to form the insert opening 23, and the mounting holes 22a are formed. Then firstly, as shown in (A) and (B) of FIG. 9, the base member 47 of the partition wall 30 is placed on the inner surface of the base member 42 of the bag body 16 which is flatly unfolded, and the upper edge region of the base member 47 is sewn (joined) to the base member 42 with sewing threads, thus forming the upper joint 55. Then as shown in (B) and (C) of FIG. 9, the regulating members 39 are sewn (joined) to the base member 42 with sewing threads by the rear edges 39b to form the rear joints 58, and at the same time, the base member 46 of the inner tube 28 is (joined) to the base member 42 by the edges 46a and 46b, thus forming the inner joint 60 and outer joint 61. Subsequently, as shown in (C) of FIG. 9 and (A) of FIG. 10, the left and right edges of the base member 42 (i.e., the front edges of the inboard side region 43 and outboard side region 44 of the base member 42) are folded in bellows such that the width in a left and right direction of the base member 42 is reduced. Then the front edges 39a of each of the regulating members 39 are sewn (joined) to the bellows-folded regions with sewing threads, thereby forming the front joints 57.

Thereafter, the lower region 42b of the base member 42 for forming the pelvis protecting portion 20 is folded back at a vicinity of the upper joint 55 such that outer surfaces of the lower region 42b and upper region 42a for forming the thorax protecting portion 21 face each other. In that state, the upper region 42a is doubled with the inner surface facing inward and the outer peripheral edges matched, as shown in (C) of FIG. 10. At this time, the lower region 42b of the base member 42 is disposed on the outside as shown in (C) of FIG. 10, and the base member 47 of the partition wall 30 protrudes out of the base member 42 of the bag body 16 in a two-fold state with the outer peripheral edges of the inboard side region 31 and outboard side region 32 matched. Then the lower edge region of the base member 47 of the partition wall 30 (specifically, the lower edges 31b and 32b of the inboard side region 31 and outboard side region 32) are sewn together with sewing threads to form the front seam 68 and rear seam 69.

Thereafter, the lower region 42b of the base member 42 of the bag body 16 is restored from the folded-back state such that the base member 42 is formed into a doubled state as shown in (A) of FIG. 11, in which the lower region 42b is doubled with the inner surface facing inward and the outer peripheral edges matched, and the base member 47 of the partition wall 30 is sandwiched between the base member 47. A region of the base member 42 above the slit 45 (i.e., an upper central region 42c) is invaginated such that the crease VI is disposed inside as shown in (A) of FIG. 11. Then the front lower peripheral region of the outer peripheral edge of the base member 42 is partially sewn up with sewing threads to form the vent hole 26. Subsequently, the outer peripheral region of the base member 42 at the rear of the vent hole 26 is sewn up with sewing threads up to the rear edge of the bag body 16 as shown in (B) of FIG. 11, thus forming a lower portion 64 of the peripheral joint 63. The lower portion 64 also sews up a region of the base member 47 of the partition wall 30 disposed at the rear of and below the rear seam 69. Then the region of the base member 42 in a vicinity of the crease (i.e., the rear end region of the base member 42) is further invaginated such that the front peripheral region and front upper peripheral region of the base member 42 are developed in a flat fashion, and the front peripheral region and front upper peripheral region are sewn up with sewing threads to form a front portion 65 of the peripheral joint 63. The front portion 65 also sews front peripheral regions of the base member 47 (i.e., front edges 31c and 32c of the inboard side region 31 and outboard side region 32) together. Thus the partition wall 30 is completed. The front portion 65 of the peripheral joint 63 further sews the regulating members 39 together at a vicinity of the front joints 57. Subsequently, the region in the vicinity of the crease of the base member 42 is restored from the invaginated state, and the retainer 12 is inserted into the bag body 16 via an unsewn region at the upper rear end region of the bag body 16 such that the mounting bolts 12b protrude out of the mounting holes 22a. Then the unsewn region is sewn up with sewing threads by an upper portion 66 of the peripheral joint 63. Thus the airbag 15 with the retainer 12 housed therein is competed as shown in (D) of FIG. 11.

Thereafter, the airbag 15 is folded up. Specifically, the airbag 15 is folded up from a generally flat and unfolded state such that the width in an up and down direction is reduced. Firstly, as shown in (A) of FIG. 17, an upper region of the thorax protecting portion 21 and a front end region of the pelvis protecting portion 20 are folded back towards the outboard side wall 18, then a front upper corner region of this airbag is folded back towards the outboard side wall 18 as shown in (B) of FIG. 17. The airbag 15 in this state will be hereinafter called an "initial-folded airbag" 105. Then the initial-folded airbag 105 is so folded up as to be reduced in width in a front and rear direction as shown in (A) of FIG. 18. The airbag 15 in this state will be hereinafter called a "front-rear contracted airbag" 106. More specifically, in the front-rear contracted airbag 106, the front region of the initial-folded airbag 105 is rolled towards the outboard side wall 18 while the rear region of the initial-folded airbag 105 is folded in a bellows fashion. Thereafter, as shown in (B) and (C) of FIG. 18, the lower end 106a region of the front-rear contracted airbag 106 (i.e., the region below the inflator 10) is folded up to form the severalfold (threefold) region 108 on creases extending generally along a left and right direction. Thus the folded-up body 107, which is elongated generally in an up and down direction and is provided with the severalfold region 108 at the lower end 107a region, is completed.

A tape member (reference numeral omitted) is mounted around the folded-up body 107 for keeping the folded-up configuration of the severalfold region 108, as shown in (C) of FIG. 18. The tape member is easily tearable. Then the inflator body 11 is set into the retainer 12 via the insertion opening 23, thus the inflator 10 is inserted into the folded-up body 107. Subsequently, the wrapping member 75 is wrapped around the folded-up body 107. Specifically, the upper end 107b region of the folded-up body 107 is inserted into the tubular region 78 of the wrapping member 75, then the main body 76 is mounted around the folded-up body 107 by attaching the mounting regions 77 to the folded-up body 107 such that the mounting bolts 12b protrude out of the mounting holes 77a, as shown in (A) and (B) of FIG. 19. Then the joint region 86 is folded back over the upper end plane of the folded-up body 107, and one of the mounting bolts 12b is inserted through the through hole 86a, as shown in (C) of FIG. 19. Thus the wrapping member 75 is mounted around the folded-up body 107. The severalfold region 108 disposed at the lower rend 107a region of the folded-up body 107 is not wrapped up by the wrapping member 75.

Subsequently, the limitation member 95 is applied on the circumference of the folded-up body 107 wrapped up by the wrapping member 75. Specifically, as shown in (B) and (C) of FIG. 20, the joint regions 96 are joined with the folded-up body 107 by inserting the mounting bolts 12b through the through holes 96a. Then as shown in (C) and (D) of FIG. 20, the loose region 97, which is doubled at the mountain-fold crease VM, is wrapped around the folded-up body 107 towards the outboard side in the doubled state. Then a tearable tape member (reference numeral omitted) is wrapped around the loose region 97 for keeping the loose region 97 wrapped, as shown in (E) of FIG. 20, thus the limitation member 95 is arranged around the folded-up body 107.

Thereafter, the mounting bolts 12b protruding out of the limitation member 95 are fastened to the seat frame 3 by the nuts 8, and the lead wires 11c are connected to the top 11d of the inflator body 11. Thus the airbag device M is mounted on the back portion 2 of the seat 1. After mounting the airbag device M, the seat 1 is furnished with the cushion 4 and surface skins 5 and 6 and then mounted on the vehicle. The lead wires 11c extending from the inflator body 11 are connected to a predetermined circuit for actuating the airbag 15.

Figure 24:
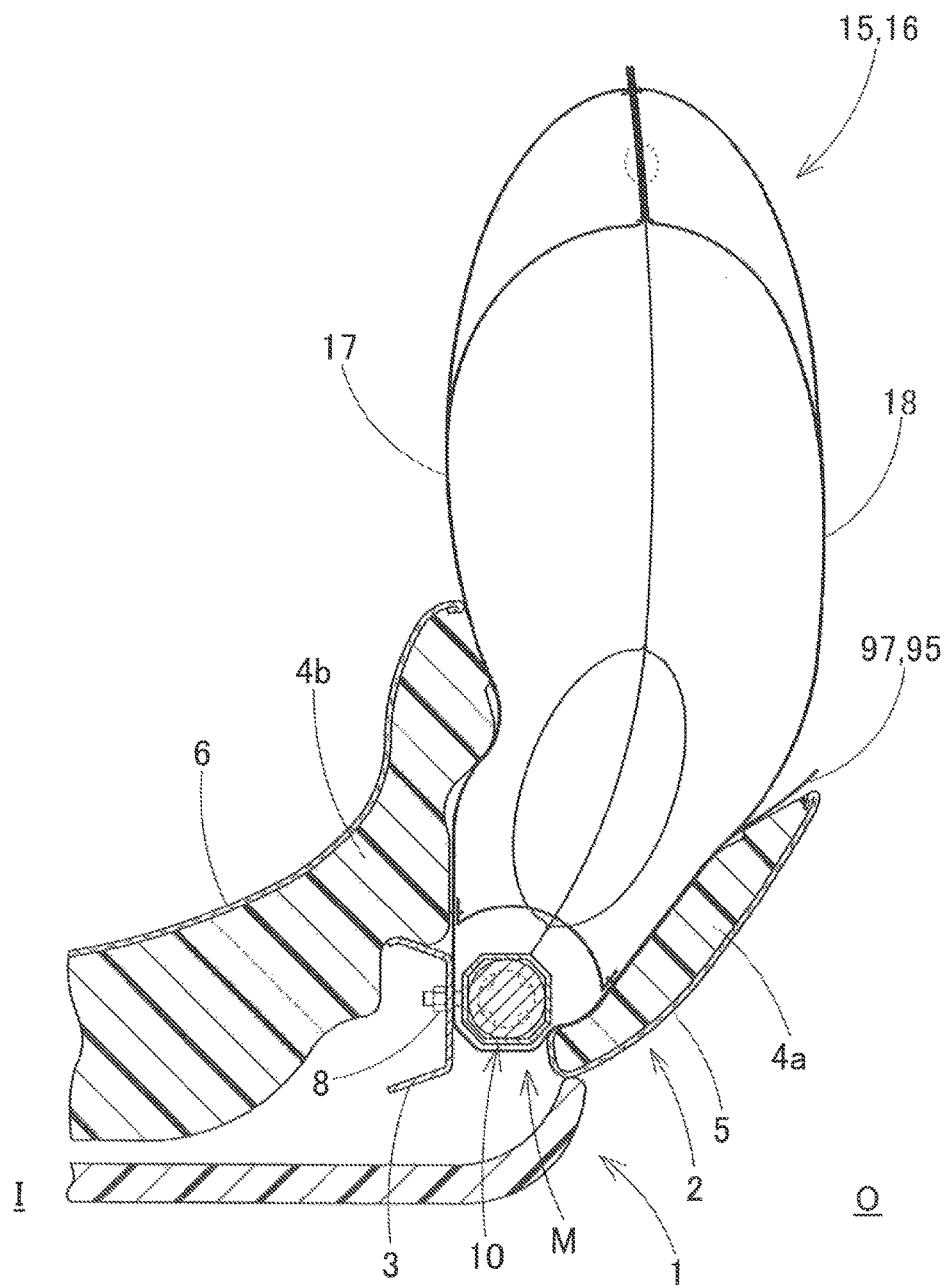
FIG. 24 is a schematic cross-sectional view depicting the airbag having completed deployment.

If the inflator body 11 of the airbag device M mounted on the vehicle is fed with an actuating signal via the lead wires 11c, an inflation gas is discharged out of the gas discharge ports 11e of the small diameter portion 11b of the inflator body 11, and inflates the airbag 15 such that the airbag 15 tears the tearable region 80 of the wrapping member 75 and the tearable region 99 of the limitation member 95, and pushes the peripheral region 4a of the cushion 4 and separates it from the center region 4b. Then the airbag 15 thrusts out of the cushion 4, protrudes forward and is deployed between an interior wall (though not shown) of the vehicle and the passenger P, as shown in FIGS. 23 and 24.

Figure 22:
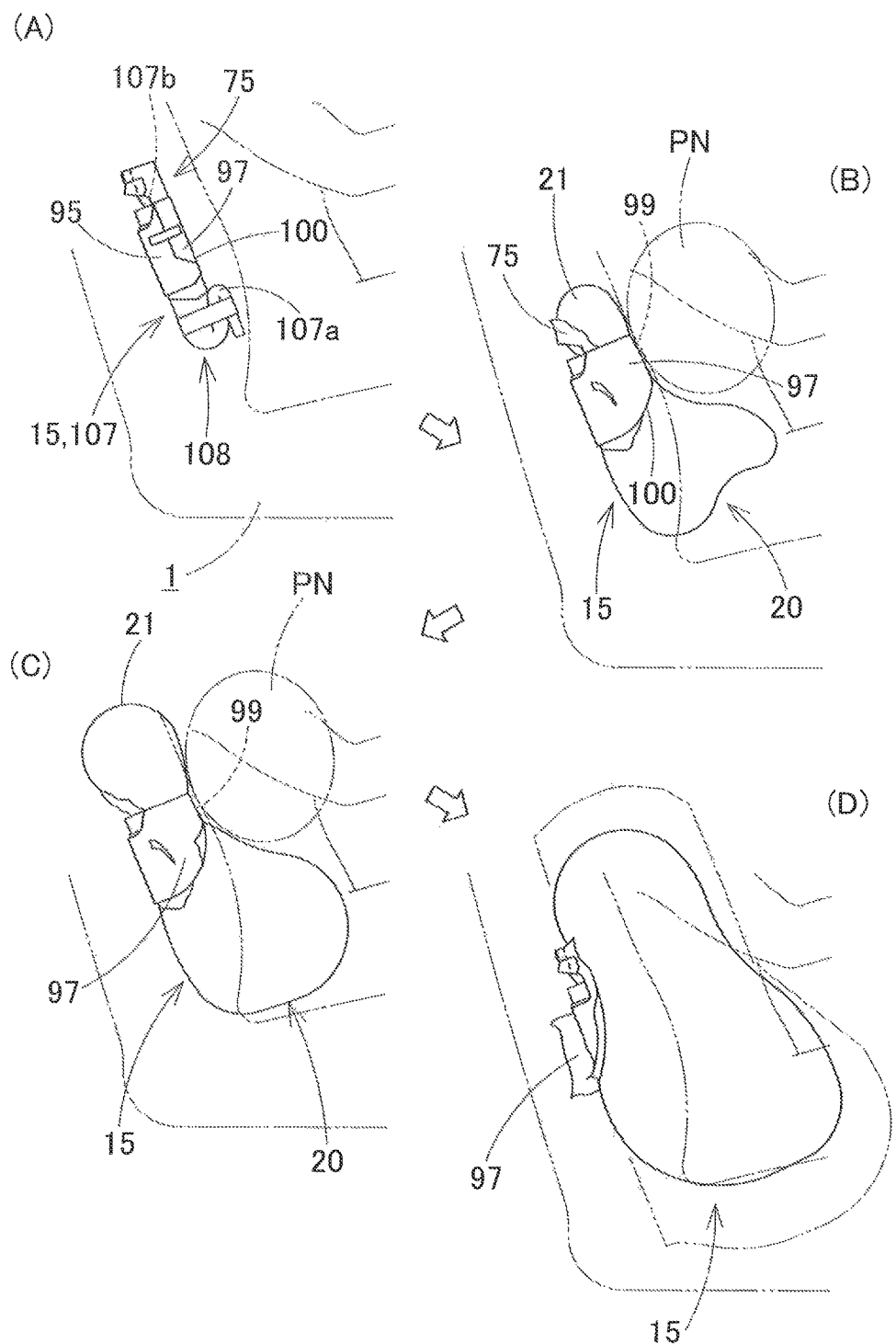
FIG. 22 schematically illustrates the behavior of the limitation member in an initial stage of airbag deployment.

In the side airbag device M of the foregoing embodiment, when starting to inflate and protrude forward out of the housing area 2b inside the back portion 2 of the seat 1, the airbag 15 fed with an inflation gas unfolds the loose region 97 of the limitation member 95 and is inflated in such a manner as to fill up a space inside the loose region 97 as shown in FIG. 21 and (B) and (C) of FIG. 22. Then the airbag 15 tears the tearable region 99 of the loose region 97 as shown in (D) of FIG. 22, and is deployed forward and completes deployment. That is, the limitation member 95 mounted around the airbag 15 is once unfolded into a generally tube and holds the airbag 15 from protruding forward, and then is torn and allows the airbag 15 to be deployed forward. The airbag 15 is thus held back from protruding considerably forward in an initial stage of inflation. Accordingly, the airbag 15 is prevented from pushing an obstacle PN (indicated by double-dotted lines in FIGS. 21 and 22) forcefully when the obstacle PN is situated just in front of the housing area 2a at airbag deployment (i.e., in an obstructed situation).

The limitation member 95 of the illustrated embodiment is formed into a band and joined to the folded-up body 107 by the joint regions 96 formed at the opposite ends. Accordingly, the limitation member 95 does not wrap up the folded-up body 107 all over, but leaves the upper and lower regions of the folded-up body 107 uncovered. Thus the uncovered regions will be allowed to inflate quickly without being regulated by the limitation member 95, as shown in (B) and (C) of FIG. 22. Further, the tearable region 99 of the loose region 97 is located at the region in a deployment direction of the airbag. With this configuration, when the airbag device M is actuated while the occupant is seated in his normal seating position (i.e., in a normal protecting situation), the uncovered region of the folded-up body 107 (i.e., the severalfold region 108) will be inflated quickly and help tear the tearable region 99 of the loose region 97 quickly, such that the airbag 15 will complete deployment in time to protect the occupant. As a consequence, in a normal protecting situation, the side airbag device M can inflate the airbag 15 quickly enough to protect the occupant P seated in the seat 1 in an adequate fashion.

Therefore, the side airbag device M of the illustrated embodiment is capable of preventing a deploying airbag 15 from giving a strong pressure to an obstacle when the obstacle is located in proximity to the airbag 15 and is, at the same time, capable of deploying the airbag 15 quickly in a normal protecting situation.

In the airbag device M of the illustrated embodiment, as shown in FIG. 2 and (C) and (D) of FIG. 20, the loose region 97 is wrapped around the folded-up body 107 in such a state that is doubled at the mountain-fold crease VM. This configuration will not cause bulkiness due to the presence of the loose region 97. Since the loose region 97 is disposed around the folded-up body 107 in a space-saving fashion, the folded-up body 107 can be stored in the housing area 2b smoothly. Without considering such an advantageous effect, the loose region may be disposed in front of the folded-up body 107 in a bellows-folded fashion.

Moreover, in the illustrated embodiment, the length of a region of the limitation member 95 between the joint regions 96 (i.e., the length of the loose region 97) is configured such that the top 97c of the loose region 97 is disposed at a position corresponding to a vicinity of the front end 2c of the back portion 2 of the seat 1 in a horizontal cross-sectional view depicting a situation in which the loose region 97 as mounted around the folded-up body 107 and mounted on the seat 1 is extended forward, as shown in FIG. 16. Further, the length of the region of the limitation member 95 between the joint regions 96 is configured such that the tearable region 99 as the airbag device M is mounted on the seat 1 is located inside the back portion 2 of the seat 1 before being torn in an initial stage of airbag deployment, as shown in FIG. 21. With this configuration, the airbag 15 will be once inflated in such a manner as to fill up a space inside the loose region 97 inside the back portion 2 of the seat 1, and then tear the tearable region 99 and protrude forward out of the back portion 2. That is, the airbag device M is capable of further preventing the airbag 15 in the course of deployment from giving a strong pressure to an obstacle when the obstacle is located in proximity to the back portion 2. If such an advantageous effect does not have to be considered, the length of the loose region may be smaller than that of the illustrated embodiment. Further alternatively, the length of the loose region can be configured longer than that of the illustrated embodiment such that the tearable region is located out of the back portion 2 of the seat 1 before being torn in an initial stage of airbag deployment.

In the airbag device M of the illustrated embodiment, the tearable region 99 includes the starting point of tearing (i.e., the cut-out region 100) at the lower end (i.e., at one end in an up and down direction). This configuration will help tear the tearable region 99 quickly from the lower end and also enable the inflating speed to be different from region to region in an up and down direction of the airbag. That is, this configuration will help predetermine a region to inflate quickly and a region to be constrained from protruding by the limitation member 95 in an up and down direction of the airbag 15. More specifically, in the illustrated embodiment, as shown in FIG. 22, the pelvis protecting portion 20, which is disposed at the lower end 107a region of the folded-up body 107, is configured to inflate quickly while the thorax protecting portion 21, which is disposed at the upper end 107b region of the folded-up body 107, is configured to be constrained by the limitation member 95 and be deployed later than the pelvis protecting portion 20.

In the airbag device M of the illustrated embodiment, the inflator 10 for feeding the airbag 15 with an inflation gas is cylindrical in outer contour and is housed in the rear end region of the folded-up airbag 107. The inflator 10 is provided with the gas discharge ports 11e (the small diameter portion 11b) at the lower end. The lower edge 97a region of the loose region 97 is located in a vicinity of the front region of the gas discharge ports 11e (the small diameter portion 11b) as shown in (D) of FIG. 20, and the loose region 97 includes, at the lower edge 97a region, the cut-out region 100 that tapers towards the tearable region 99 such that the cut-out region 100 constitutes the starting point of tearing of the tearable region 99. With this configuration, when fed with an inflation gas from the gas discharge ports 11e located at the lower end region of the inflator 10, the severalfold region 108, which is disposed at the lower end 107a of the folded-up body 107, is firstly inflated. Since the loose region 97 is provided with the cut-out region 100 at the lower edge 97a, the severalfold region 108 is allowed to be inflated quickly without being influenced by the loose region 97. Then along with the inflation of the severalfold region 108, the tearable region 99 will be torn sequentially from the lower end. Therefore, the tearable region 99 will be torn quickly and the whole airbag 15 will be deployed considerably forward.

In the foregoing embodiment, moreover, the airbag 15 includes the pelvis protecting portion 20 for protecting the pelvis H of an occupant P seated in the seat 1 at the lower end region of the airbag 15 at deployment. The pelvis protecting portion 20 constitutes the severalfold region 108 and protrudes out of the limitation member 95 downwardly in the folded-up body 107. With this configuration, the airbag device M of the embodiment can inflate the pelvis protecting portion 20 quickly in a normal protecting situation and quickly arrest the pelvis H which has a greater mass and a greater kinetic energy at moving than the thorax.

In the foregoing embodiment, the loose region 97 of the limitation member 95 is provided with the cut-out region 100 having a tapering shape at the lower edge 97a region, and the tearable region 99 is configured to start tearing from the cut-out region 100. As described above, the tearable region 100 is configured to have a high breaking strength in the lower region 99D which is proximate to the cut-out region 100, the starting point of tearing, while having a low breaking strength in the upper region 99U disposed in a lower reach of tearing. That is, the tearable region 99 is configured to start tearing late, and also configured such that the tearing propagates towards the upper end quickly once the tearing begins. This configuration will help constrain the start of tearing of the tearable region 99 and prevent the airbag 15 from pushing an obstacle in an obstructed situation (when the obstacle is situated in proximity).

In the foregoing embodiment, the limitation member 95 is formed of a woven fabric having flexibility, and the tearable region 99 is formed by rouletting the woven fabric intermittently so as to form a plurality of slits or roulettes 99a. However, the limitation member may be formed of any sheet material having flexibility, such as a film or the like of synthetic resin. Moreover, the configuration of the tearable region should not be limited to such intermittent slits as described above. By way of example, if the limitation member is formed of a film material, the tearable region may be formed of a thinned region of the film material.

Figure 25:
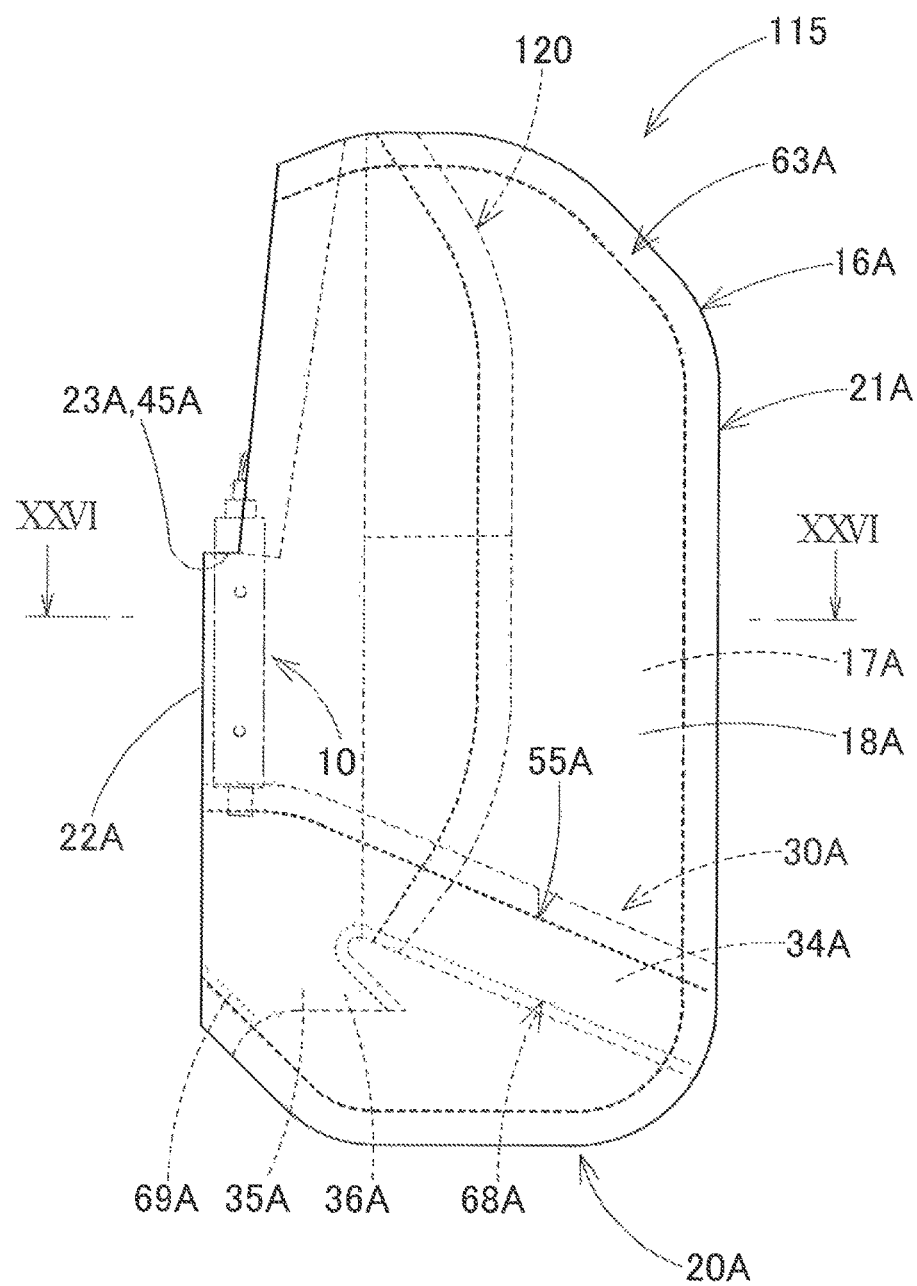
FIG. 25 is a front elevation of an airbag of an alternative embodiment.
Figure 26:
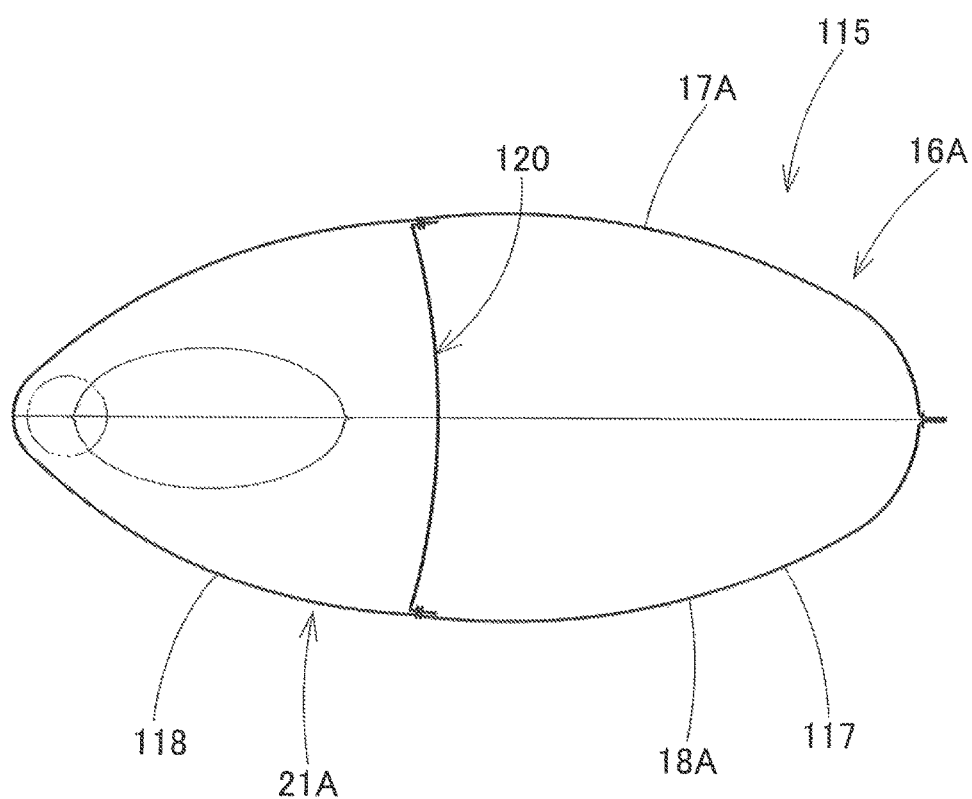
FIG. 26 is a sectional view taken along line XXVI-XXVI of FIG. 25.
Figure 27:
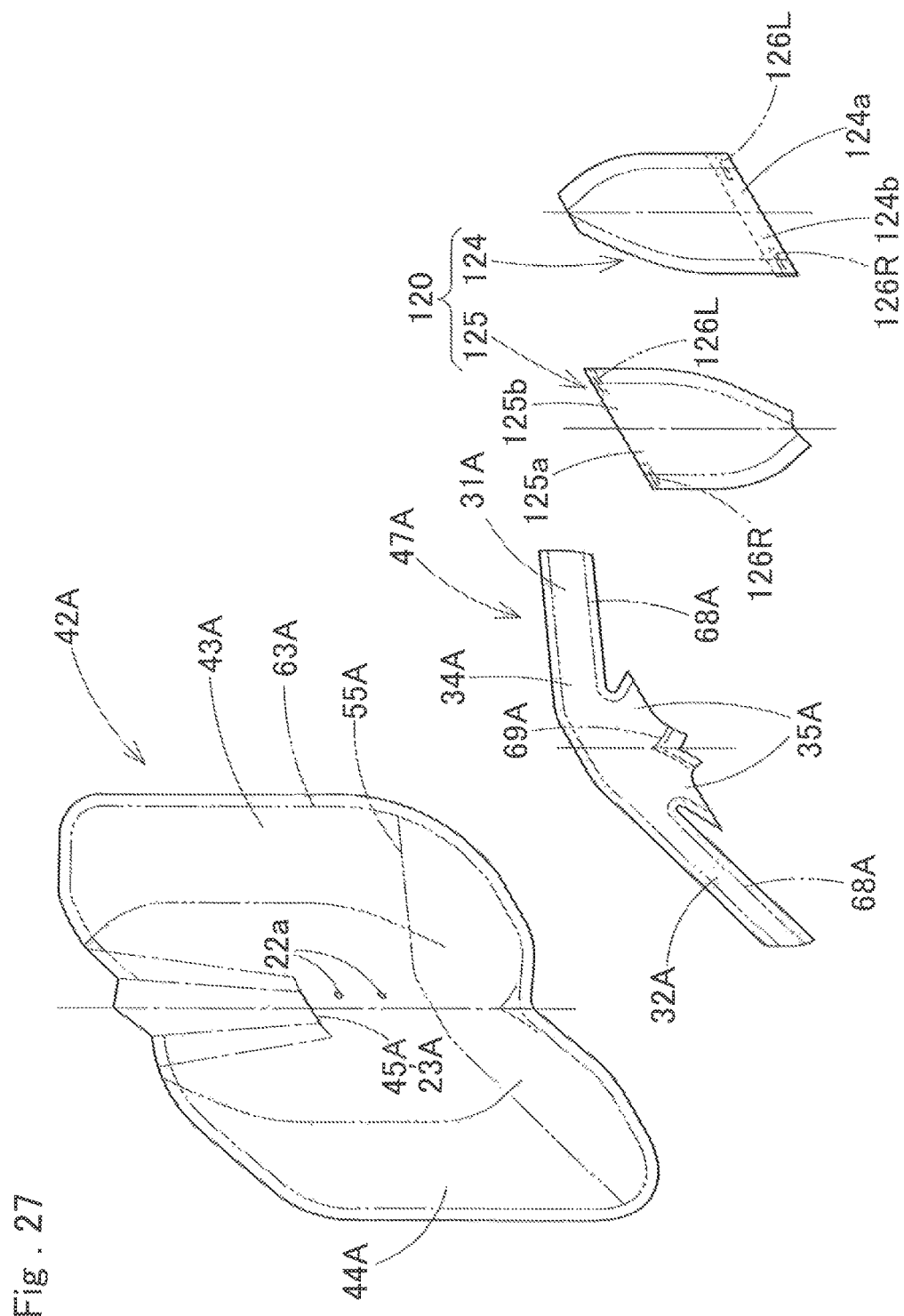
FIG. 27 depicts base members of the airbag of FIG. 25 schematically.

FIGS. 25 to 27 depict an airbag 115 according to an alternative embodiment of the invention. The airbag 115 includes a bag body 16A, a partition wall 30A and a front-rear partition wall 120. The bag body 16A and partition wall 30A each have a similar configuration to the bag body 16 and partition wall 30 of the above-described airbag 15, and therefore, they will be assigned "A" at the end of common reference numerals and their detailed descriptions will be omitted.

Figure 29:
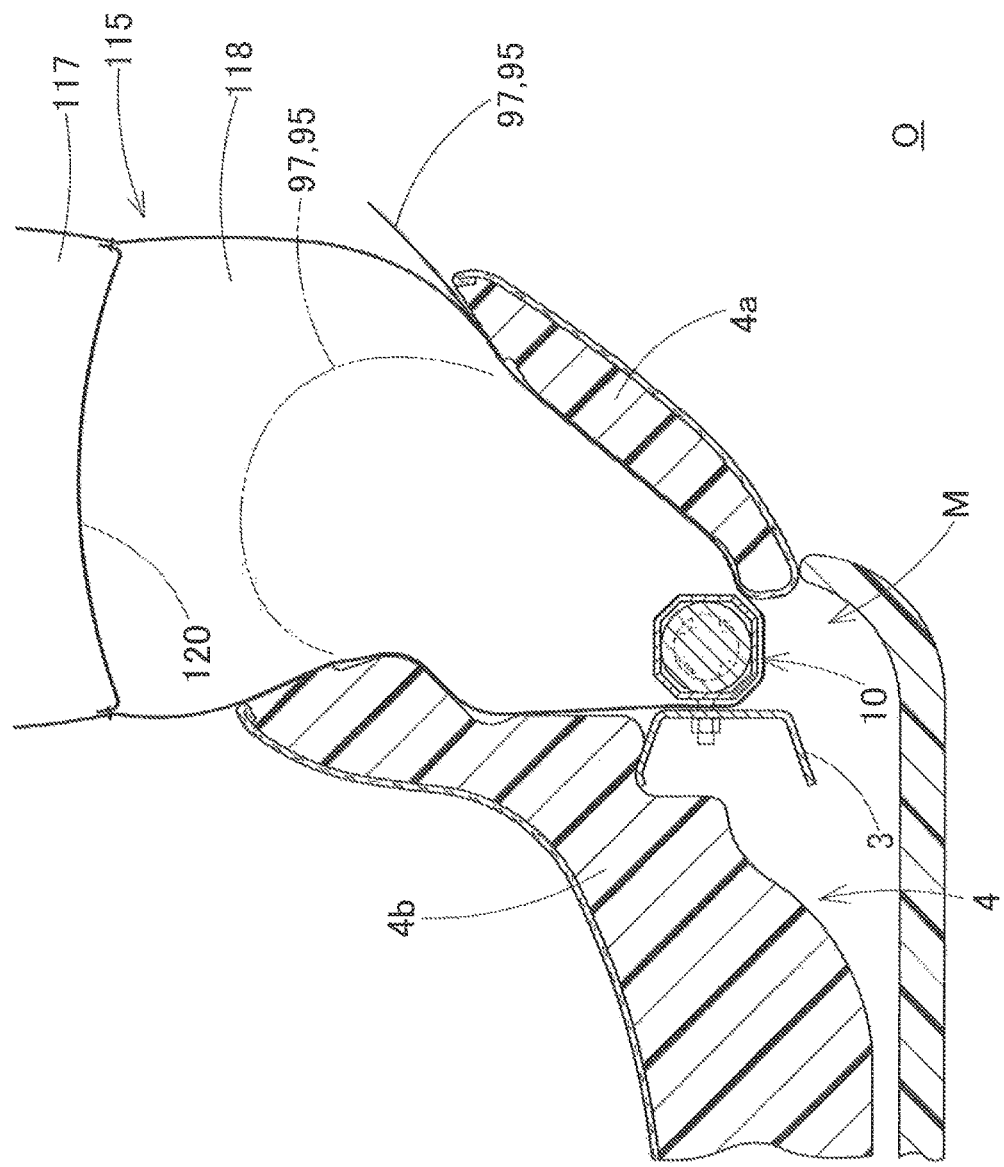
FIG. 29 is a schematic cross-sectional view of a side airbag device employing the airbag of FIG. 25 as the airbag has completed deployment.

As shown in FIGS. 25 and 26, the front-rear partition wall 120 is arranged generally along an up and down direction inside the thorax protecting portion 21A and partitions the thorax protecting portion 21A into a front region 117 and a rear region 118. The front-rear partition wall 120 is joined (sewn) to the thorax protecting portion 21A by the outer peripheral edge. Specifically, the outer peripheral edge of the front-rear partition wall 120 except the lower edge is sewn to the inboard side wall 17A and outboard side wall 18A and the lower edge is joined (sewn) to the partition wall 30A which partitions the thorax protecting portion 21A from pelvis protecting portion 20A. Even more specifically, the lower edge of the front-rear partition wall 120 is sewn to a vicinity of the front side of the communication region 35A of a wall body 34A of the partition wall 30A. The front-rear partition wall 120 is configured to be deployed generally along an up and down direction and generally in parallel to the rear edge of the bag body 16A slightly at the rear of the center in a front and rear direction of the thorax protecting portion 21A. That is, in the airbag 115, the front-rear partition wall 120 partitions the thorax protecting portion 21A into the front region 117 and rear region 118. Further, as shown in FIGS. 29 and 30, the front-rear partition wall 120 is configured to be deployed in front of the back portion 2 of the seat 1 and in proximity to the front end 2c of the back portion 2 such that the rear region 118 of the thorax protecting portion 21A is deployed at a side of the shoulder S of the occupant P to arrest the shoulder S.

Figure 28:
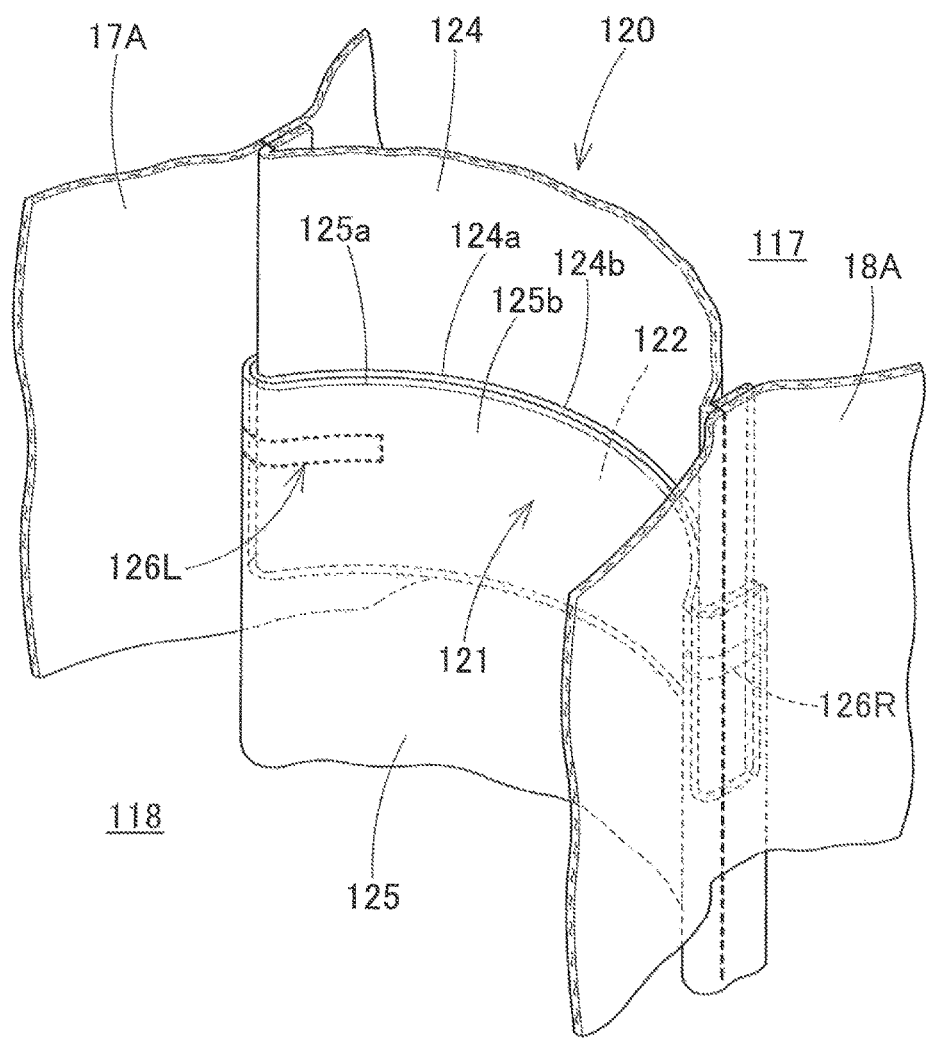
FIG. 28 is a partial enlarged schematic perspective view of a valve mechanism formed on a front-rear partition wall in the airbag of FIG. 25.
Figure 30:
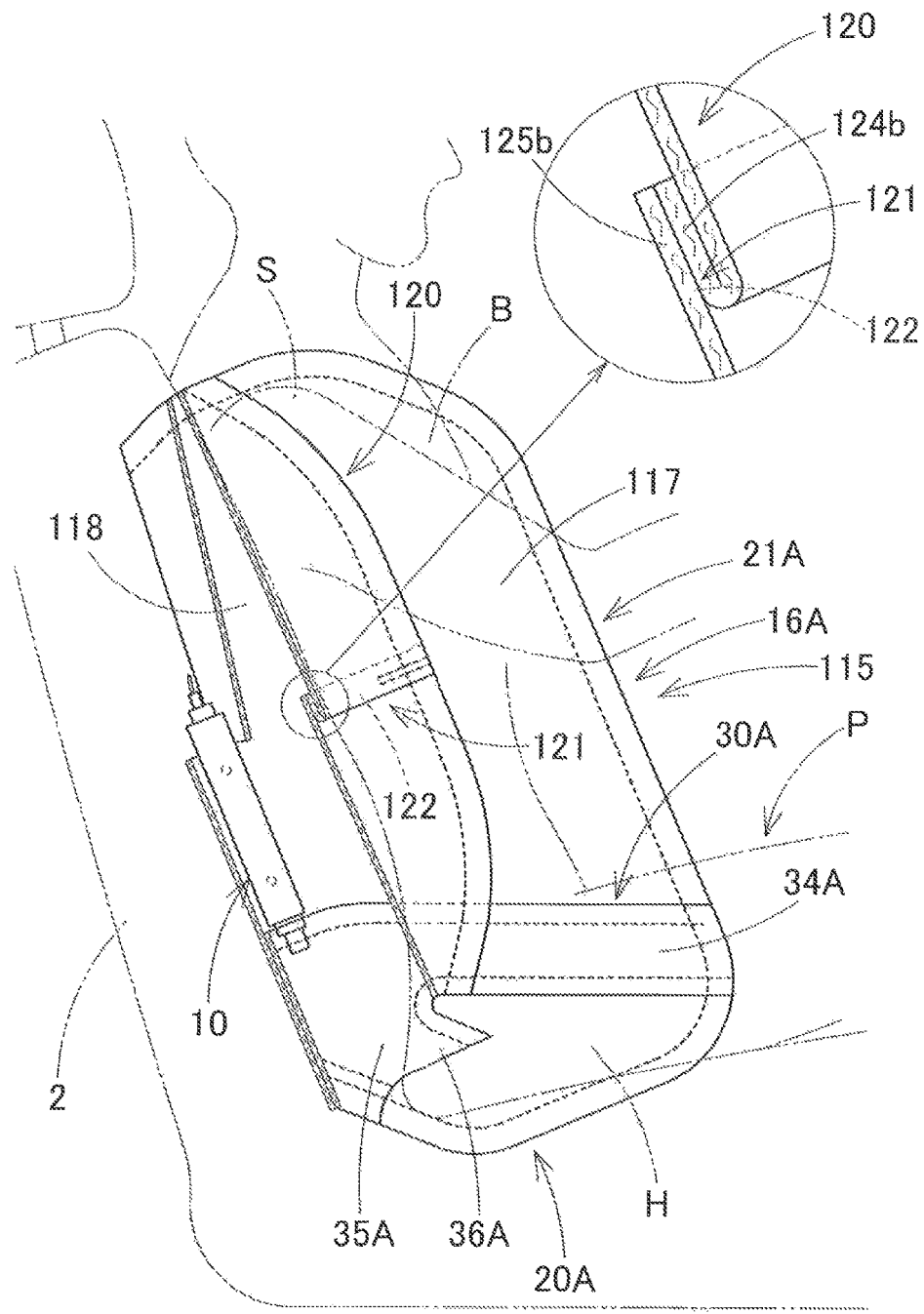
FIG. 30 is a schematic vertical sectional view of the side airbag device employing the airbag of FIG. 25 as the airbag has completed deployment.
Figure 31:
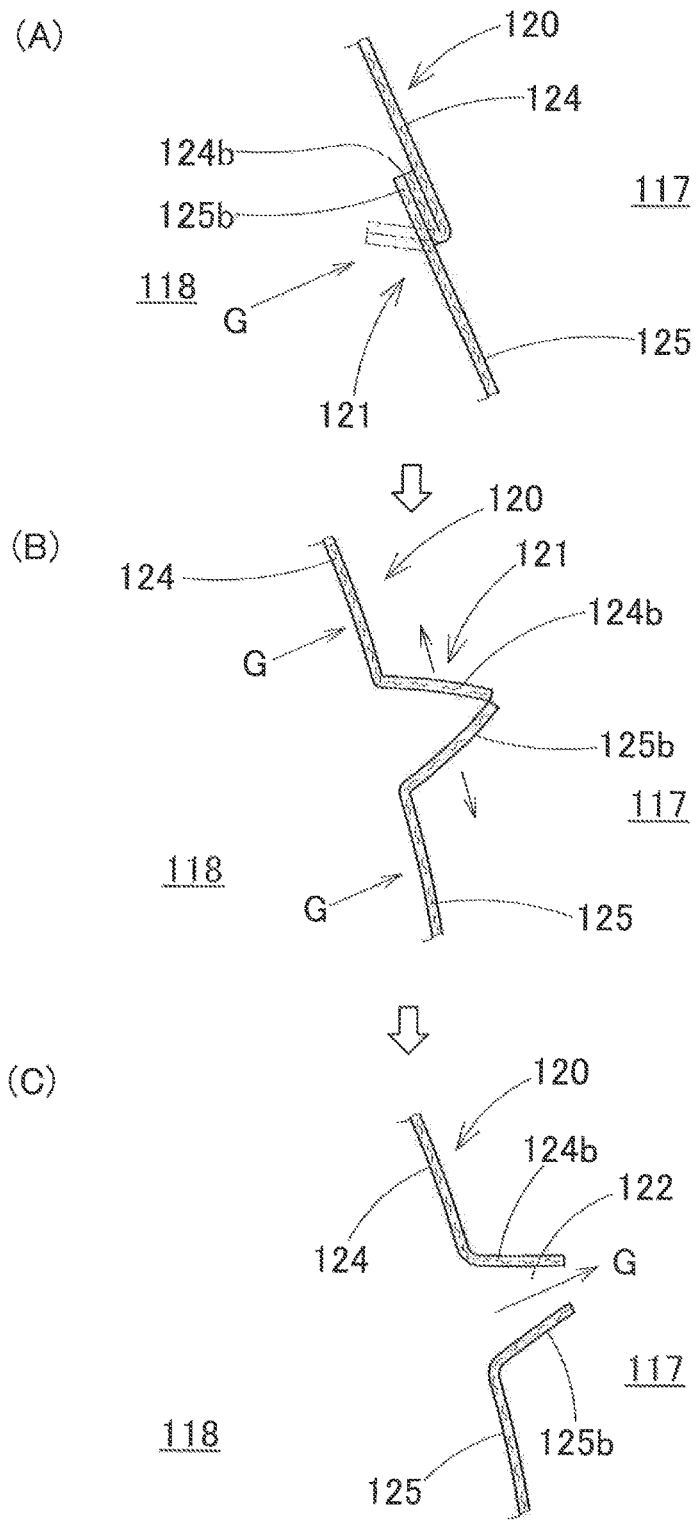
FIG. 31 is a partial enlarged sectional view depicting the behavior of the valve mechanism of the airbag of FIG. 25.

Referring to FIGS. 28, 30 and 31, the front-rear partition wall 120 is provided with a valve mechanism 121 that helps control the internal pressure of the rear region 118 of the thorax protecting portion 21A and a communication region 122 that is openable at the opening of the valve mechanism 121. In the illustrated embodiment, the front-rear partition wall 120 is composed of two pieces of base members 124 and 125 which are arranged one above the other, as shown in FIGS. 27 and 30. The front-rear partition wall 120 is formed by laying the base member 124 and 125 one on the other such that the lower edge 124a of the upper base member 124 and the upper edge 125a of the lower base member 125 are matched, and stitching the base members 124 and 125 together with sewing threads at a vicinity of the lower edge 124a and upper edge 125a and along a left and right direction, except a region in a vicinity of the center in a left and right direction, and opening the base members 124 and 125. Thus the lower edge 124a of the upper base member 124 is turned over and overlaps with the upper edge 125a of the lower base member 125, as shown in FIG. 28. In that state in which the lower edge 124a of the upper base member 124 is turned over, the base members 124 and 125 are joined to the thorax protecting portion 21A (i.e., to the inboard side wall 17A and outboard side wall 18A) by the outer peripheral edges. The unsewn region in a vicinity of the center in a left and right direction of the base members 124 and 125 (i.e., the gap between the left and right seams 126L and 126R) constitutes the communication region 122, and regions of the lower edge 124a of the upper base member 124 and the upper edge 125a of the lower base member 125 which form the periphery of the communication region (gap) 122 (namely, a peripheral region 124b and a peripheral region 125b) constitute the valve mechanism 121. That is, the front-rear partition wall 120 of the illustrated embodiment is formed into an elongated shape by sewing together adjoining edges (the lower edge 124a and upper edge 125a) of the two base members 124 and 125 arranged one above the other, except the vicinity of the center in a left and right direction of the base members 124 and 125. The seams 126L and 126R sewing the lower edge 124a and upper edge 125a together are formed generally along a left and right direction.

In operation, when the airbag 115 is fed with an inflation gas G from the inflator 10, the rear region 118 of the thorax protecting portion 21A is firstly inflated and then the pelvis protecting portion 20A is inflated with an inflation gas fed via the communication region 35A formed in the partition wall 30A. At this time, the limitation member 95 once holds the rear region 118 from inflating, and then the rear region 118 completes inflation. In the airbag 115, the front-rear partition wall 120 partitioning the front region 117 from the rear region 118 of the thorax protecting portion 21A is formed into a generally band elongated in an up and down direction. This configuration will help exert a strong tension force along a width direction of the front-rear partition wall 120 (i.e., in a left and right direction) when the rear region 118 is inflated. That is, when the rear region 118 is inflated, the tension force will be exerted on the front-rear partition wall 120 along the seams 126L and 126R which sew the lower edge 124a of the upper base member 124 and the upper edge 125a of the lower base member 125 together and are disposed on the left and right of the valve mechanism 121. This tension force acts to keep the peripheral regions 124b and 125b of the communication region 122 tensed and keep the valve mechanism 121 closed, as shown in (A) of FIG. 31.

Then, when the rear region 118 and pelvis protecting portion 20A has almost completed inflation and the rear region 118 cushions the shoulder S of the occupant P and is increased in internal pressure, the valve mechanism 121 is opened. Specifically, when the inboard side region of the rear region 118 (i.e., the rear region of the inboard side wall 17A) cushions the shoulder S of the occupant P and the internal pressure of the rear region 118 is increased, the front-rear partition wall 120 is pushed towards the front region 117 and deformed, and along with the deformation, the peripheral regions 124b and 125b of the communication region 122 in the base members 124 and 125 are separated and pushed out into the front region 117 in a reversed fashion via the communication region 122, as shown in (B) of FIG. 31. Thus the valve mechanism 121 is opened and allows the inflation gas G to flow into the front region 177 via the communication region 122, as shown in (C) of FIG. 31.

The airbag 115 with the above-described configuration is also folded up into the folded-up body and wrapped by the limitation member 95, and is mounted on the back portion 2 of the seat 1. With the configuration of the airbag 115, in an initial stage of airbag deployment, only the rear region 118 of the thorax protecting portion 21A is inflated and deployed in an extended fashion in an up and down direction, while the front region 117 is constrained from inflating before the rear region 118 arrests the shoulder S of the occupant P because the valve mechanism 121 in the front-rear partition wall 120 is not opened. Therefore, with the airbag device with the airbag 115 and the limitation member 95 (see the double-dotted lines in FIG. 29), the airbag 115 will be constrained from protruding forward in an initial stage of airbag deployment in a further adequate fashion.

In the foregoing embodiment, the limitation member 95 is mounted around the folded-up body 107 which is wrapped by the wrapping member 75, and the wrapping member 75 is also configured to constrain the airbag 15 from protruding forward at airbag deployment. That is, the airbag 15 is constrained from protruding forward in an initial stage of airbag deployment in an undue fashion due to cooperation of the limitation member 95 and the wrapping member 75. However, the airbag device may, of course, be configured without such a wrapping member.

What is claimed is:

1. A side airbag device adapted to be mounted on a back portion of a seat of a vehicle, the airbag device comprising:
    an airbag that is housed in a housing in a folded-up configuration and is configured to be deployed forward when fed with an inflation gas by an inflator, the folded-up airbag having an elongated outer contour extending generally in an up and down direction as mounted on the seat;
    a limitation member that is arranged around the folded-up airbag for constraining the airbag from protruding forward at airbag deployment, the limitation member being formed of a flexible sheet member and having a band shape, the limitation member comprising:
        a pair of joint regions that are located at opposite ends of the limitation member and joined with the folded-up airbag; and
        a loose region that is disposed between the joint regions and arranged around the folded-up airbag in such a manner as to be remote from the folded-up airbag, the loose region being disposed on a side of the folded-up airbag towards which the airbag protrudes, wherein a length of the loose region between the joint regions is longer than a length of an outer circumference of the folded-up airbag and shorter than a film length of the airbag as deployed, and wherein the loose region includes, in a region thereof in a deployment direction of the airbag, a tearable region that is tearable in such a manner as to split up the loose region between the joint regions at the airbag deployment,
    wherein:
        the tearable region includes a starting point of tearing at one end thereof in the up and down direction;
        the inflator is generally cylindrical in outer contour and is housed in a rear end region of the folded-up airbag;
        the inflator is provided with gas discharge ports at a lower end thereof;
        a lower edge of the loose region is located in a vicinity of a front region of the gas discharge ports;
        the loose region includes a cut-out region that tapers towards the tearable region, the cut-out region constitutes the starting point of tearing of the tearable region;
        the airbag includes a pelvis protecting portion for protecting a pelvis of an occupant seated in the seat at a lower end region of the airbag at deployment; and
        the pelvis protecting portion protrudes out of the limitation member downwardly in the folded-up airbag.

2. The side airbag device of claim 1, wherein the loose region is wrapped around the folded-up airbag in such a state that is doubled on a mountain-fold crease.

3. The side airbag device of claim 1, wherein the length of the loose region of the limitation member between the joint regions is configured such that a top of the loose region is disposed at a position corresponding to a vicinity of a front end of the back portion of the seat in a horizontal cross-sectional view depicting a situation in which the loose region as mounted around the folded-up airbag and mounted on the seat is extended forward.

4. The side airbag device of claim 1, wherein the length of the loose region of the limitation member between the joint regions is configured such that the tearable region as the airbag device is mounted on the seat is located inside the back portion of the seat before being torn in an initial stage of the airbag deployment.

5. The side airbag device of claim 1, wherein the airbag further includes:
    a thorax protecting portion that is located above the pelvis protecting portion at the airbag deployment for protecting a thorax of the occupant; and
    a regulating member that is disposed inside the thorax protecting portion and helps reduce a width in a front and rear direction of the thorax protecting portion compared to that of the pelvis protecting portion at the airbag deployment.

6. The side airbag device of claim 1, wherein the airbag further includes:
    a thorax protecting portion that is located above the pelvis protecting portion at the airbag deployment for protecting a thorax of the occupant;
    a front-rear partition wall that is located inside the thorax protecting portion and partitions the thorax protecting portion into a front region and a rear region; and
    a valve mechanism that is formed on the front-rear partition wall, wherein the valve mechanism opens at the airbag deployment and closes when the rear region cushions a shoulder of the occupant.

7. The side airbag device of claim 1, wherein:
    the airbag further includes a wrapping member that is wrapped around the folded-up airbag;
    the limitation member is mounted around the folded-up airbag which is wrapped by the wrapping member; and
    the wrapping member constrains the airbag from protruding forward at the airbag deployment.

* * * * *